United States Patent [19]

Ishikawa et al.

[11] Patent Number: 5,950,805
[45] Date of Patent: Sep. 14, 1999

[54] CONVEY APPARATUS, AND MOVABLE DRIVING MECHANISM FOR MOVABLE WORK APPARATUS

[75] Inventors: Yoshinobu Ishikawa; Tadashi Munakata, both of Tokyo, Japan

[73] Assignee: Kabushiki Kaisha Toshiba, Kawasaki, Japan

[21] Appl. No.: 08/739,288

[22] Filed: Oct. 29, 1996

[30] Foreign Application Priority Data

| Jun. 1, 1995 | [JP] | Japan | 7-135220 |
| Oct. 31, 1995 | [JP] | Japan | 7-283291 |
| Feb. 22, 1996 | [JP] | Japan | 8-034701 |

[51] Int. Cl.$^6$ .................................................. B65G 35/00
[52] U.S. Cl. ............................................................ 198/630
[58] Field of Search .................................. 198/630, 371.1

[56] References Cited

U.S. PATENT DOCUMENTS

| 3,224,734 | 12/1965 | Hill . | |
| 3,327,832 | 6/1967 | Kyle | 198/630 |
| 3,985,064 | 10/1976 | Johnson | 198/630 |
| 4,848,168 | 7/1989 | Negishi . | |

FOREIGN PATENT DOCUMENTS

| 2-41158 | 2/1990 | Japan . | |
| 3-47860 | 7/1991 | Japan . | |
| 7-28535 | 5/1995 | Japan . | |
| 1032637 | 6/1966 | United Kingdom | 198/630 |

OTHER PUBLICATIONS

Patent Abstracts of Japan, vol. 96 No. 01, JP–8 004649, Jan. 9, 1996.

*Primary Examiner*—William E. Terrell
*Assistant Examiner*—Mark Deuble
*Attorney, Agent, or Firm*—Oblon, Spivak, McClelland, Maier & Neustadt, P.C.

[57] ABSTRACT

This invention provides a convey apparatus capable of conveying a convey target without locally applying an excessive force to it. The convey apparatus includes a convey portion and a medium pressure switching unit. The convey portion has a plurality of medium passages for passing a medium therethrough, and at least part of the surface of the convey portion is made of an elastic material. The diameters of the medium passages can be freely increased/decreased. The medium pressure switching unit controls the pressures of a medium supplied to the respective medium passages of the convey portion to increase or decrease the diameters of the medium passages, thereby generating a carrier wave on the surface of the convey portion. Therefore, according to this convey apparatus, the pressures of the medium supplied to the respective medium passages of the convey portion are controlled by the medium pressure control unit in order to increase or decrease the diameters of the medium passages, thereby generating a carrier wave on the surface of the convey portion made of the elastic material. In this way, convey targets ranging from a flat convey target to a three-dimensional convey target can be conveyed without locally applying an excessive fore to them.

11 Claims, 19 Drawing Sheets

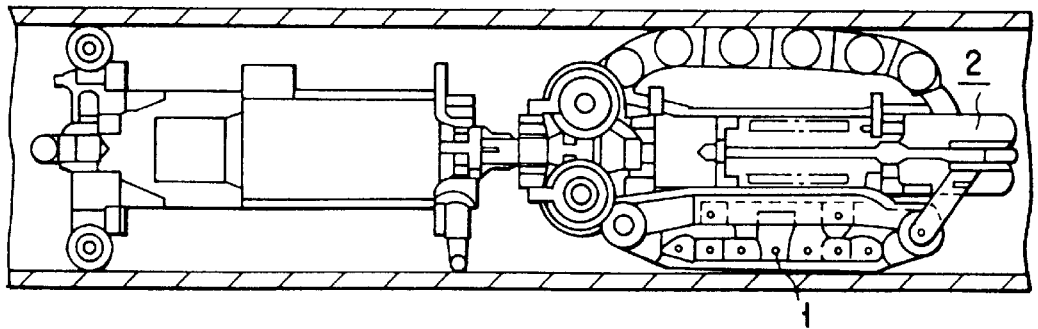
F I G. 1 (PRIOR ART)
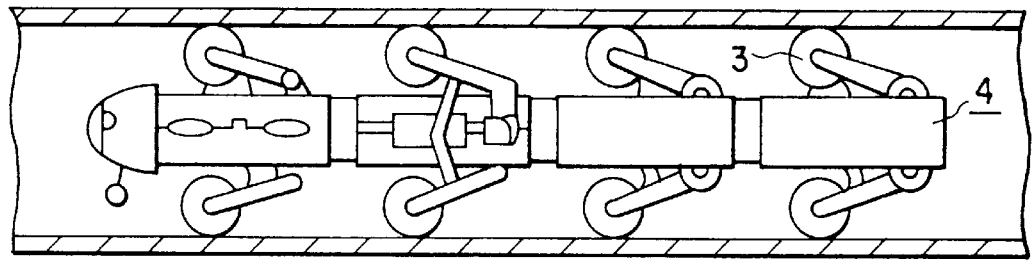
F I G. 2 (PRIOR ART)
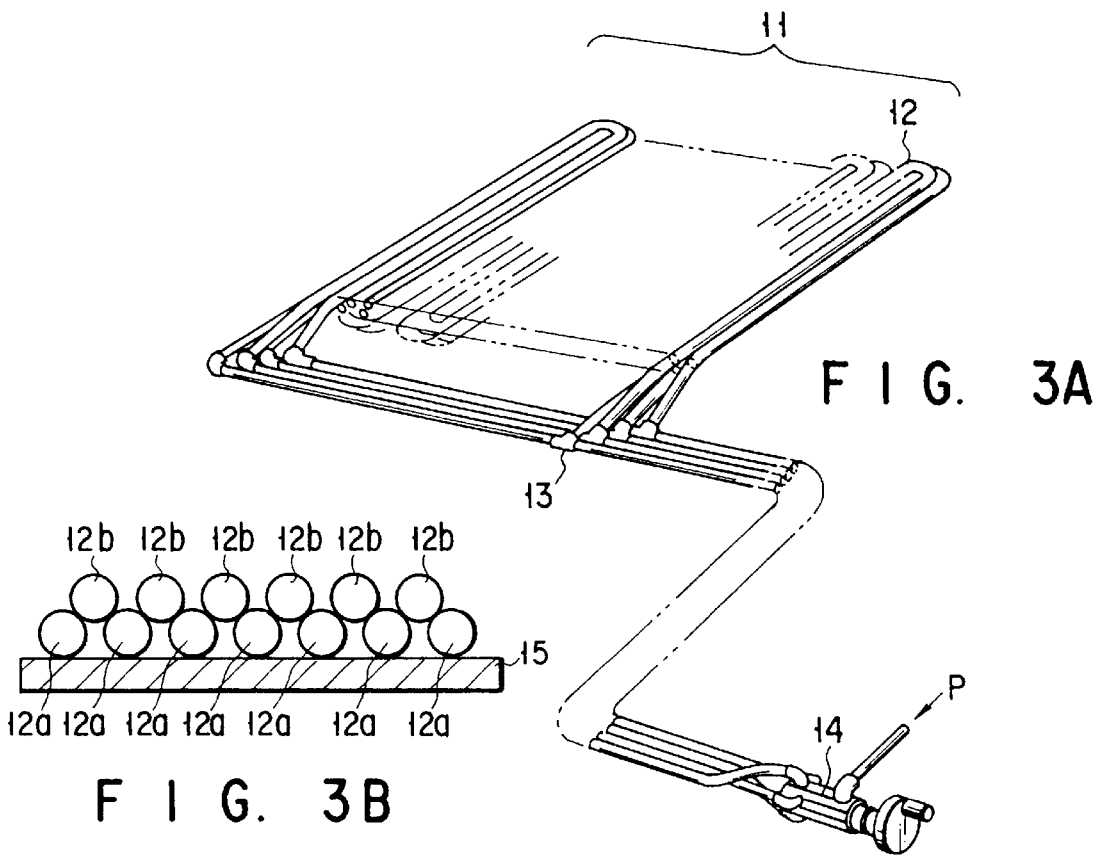
F I G. 3A
F I G. 3B

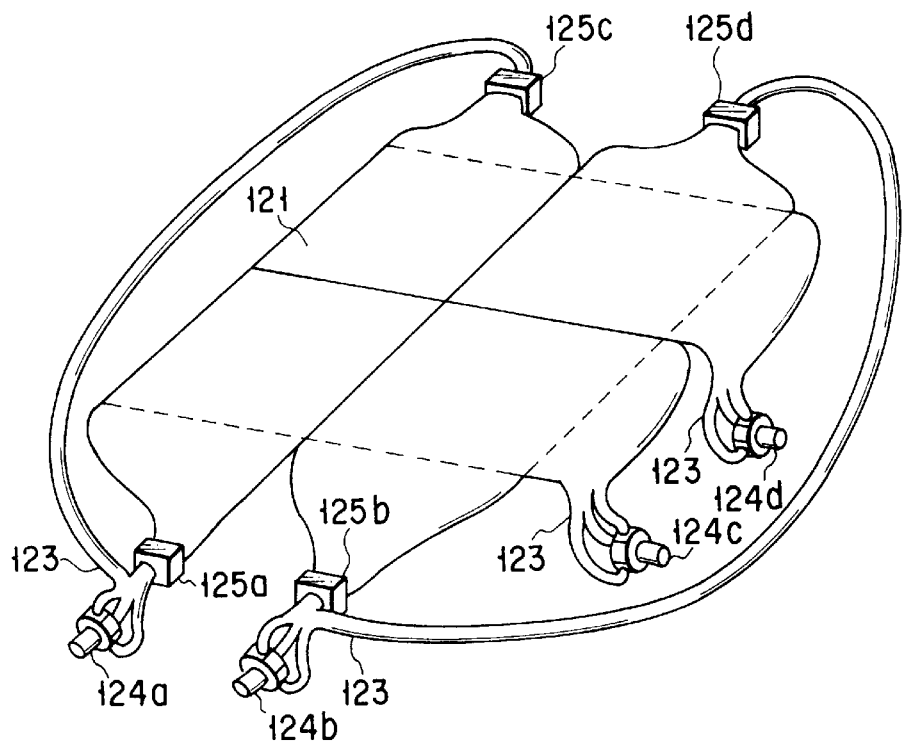
F I G. 19
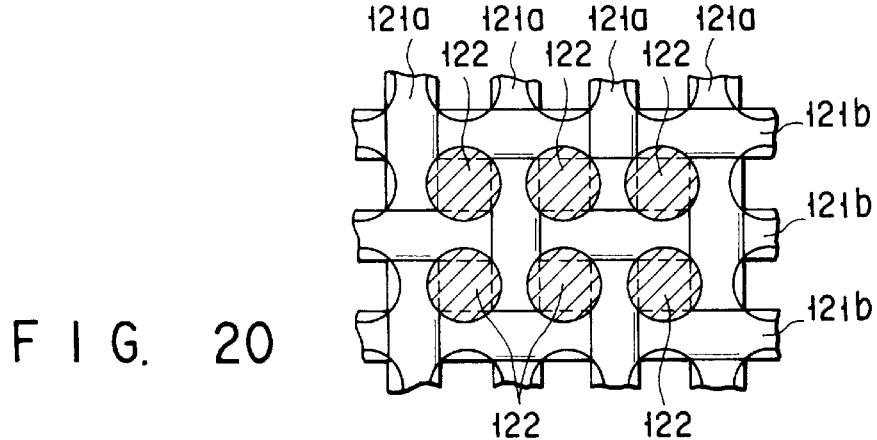
F I G. 20
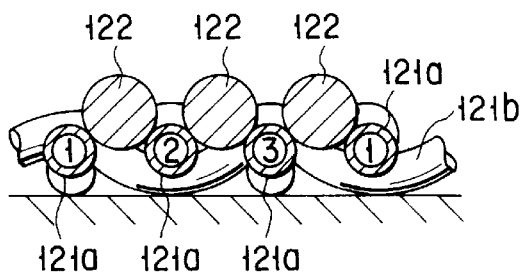
F I G. 21

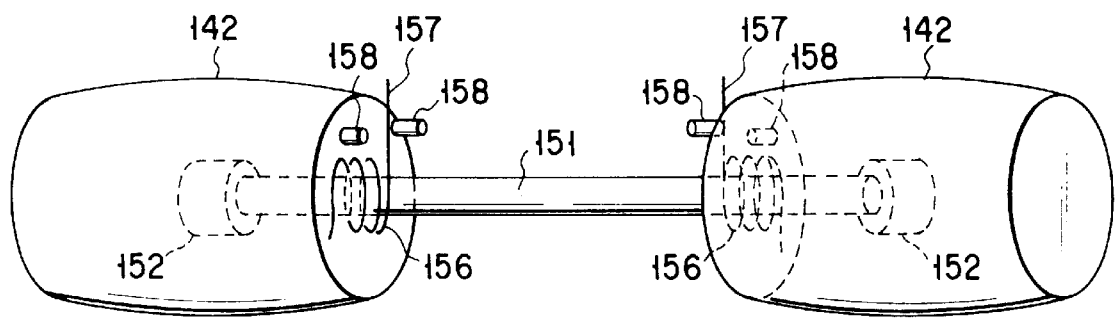
F I G. 26
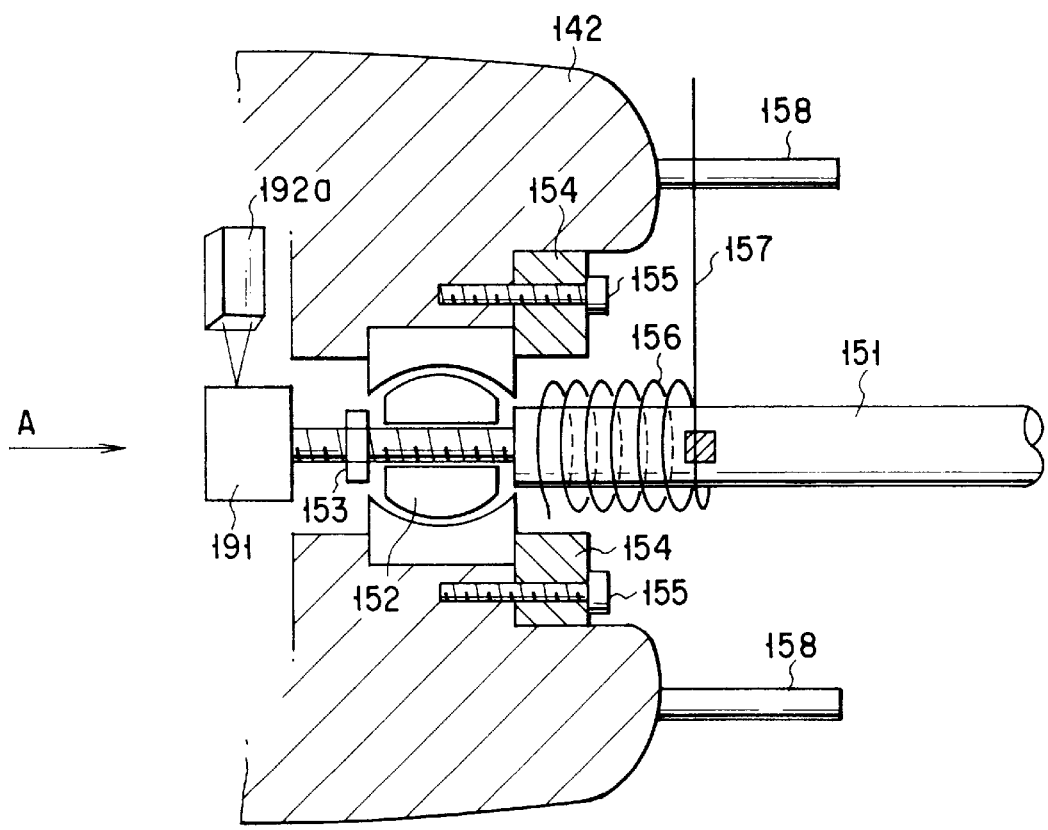
F I G. 27

CONVEY APPARATUS, AND MOVABLE DRIVING MECHANISM FOR MOVABLE WORK APPARATUS

BACKGROUND OF THE INVENTION

1. Field of the Invention

The present invention relates to a convey apparatus for conveying an article to a desired position.

The present invention also relates to a movable driving mechanism for a movable work apparatus that performs an operation after it moves to a destination place.

2. Description of the Related Art

As a convey apparatus for conveying an article to a desired position, a belt conveyor for placing a convey target, e.g., a product or earth and sand, on its belt and transporting the target, a robot, a truck, or the like is employed.

As a movable driving mechanism for a movable work apparatus which performs an operation after it moves to a destination place, for example, wheels, a caterpillar, or the like are employed.

When conveying a soft object by using the above-described convey apparatus, e.g., a belt conveyor, the belt of the belt conveyor, the arm of the robot, the lift unit of the truck, or the like must be provided with a device for softly supporting the entire soft object from below. In order to softly support the soft object placed on the convey apparatus, the convey apparatus must be thin.

If, however, the soft object is placed on a soft bed or the like, when the operator tries to put the soft object on the convey apparatus by bringing it into contact with the convey apparatus without lifting it up, an excessive force locally acts on the soft object.

When an operation is performed while moving in a pipe or the like with the movable driving mechanism of the movable work apparatus, the posture of the movable work apparatus changes in various manners with respect to the pipe. At a branching or bent portion of the pipe, the movable work apparatus must run past the corner portion of the pipe.

In order to solve these problems, when the movable work apparatus travels in a pipe by using a conventional movable driving mechanism, e.g., wheels or a caterpillar, the movable driving mechanism is arranged around the movable work apparatus so that the movable work apparatus can travel while maintaining its posture in the pipe or can travel even if it is turned over upon tilting.

FIG. 1 is a side view showing a movable work apparatus 2 around which a caterpillar 1 is arranged, and FIG. 2 is a side view showing the arrangement of a movable work apparatus 4 around which wheels 3 are arranged. When these arrangements are adopted, the posture of the movable work apparatus in a pipe can be maintained, and the movable work apparatus can travel even if it is turned over upon tilting.

However, since the movable driving mechanism of this movable work apparatus is complicated, it is difficult for the movable work apparatus to travel past a corner portion, e.g., a branching or bent portion, of the pipe.

In such a case, the space for loading an operation unit in the movable work apparatus is decreased, so that the application of the movable work apparatus is limited.

SUMMARY OF THE INVENTION

The present invention has been made in view of the above situations, and has as its object to provide a convey apparatus capable of conveying a convey target without locally applying an excessive force to it.

It is another object of the present invention to provide a movable driving mechanism for a movable work apparatus having a simple arrangement, which can freely move in a pipe and can achieve a sufficiently large space for loading an operation unit therein.

According to the first aspect of the present invention, there is provided a convey apparatus comprising: a convey portion having a convey surface for conveying a convey target and medium passages for passing a medium therethrough, at least part of the convey surface being made of an elastic material and diameters of the medium passages being capable of being freely increased and decreased; and carrier wave generating means for controlling pressures of the medium supplied to the respective medium passages of the convey portion to increase or decrease the diameters of the medium passages and generating a carrier wave on the convey surface of the convey portion.

According to this convey apparatus, the pressures of the medium supplied to the respective medium passages of the convey portion are controlled by the carrier wave generating means in order to increase or decrease the diameters of the medium passages, thereby generating a carrier wave on the surface of the convey portion made of the elastic material. Thus, convey targets ranging from a flat convey target to a three-dimensional convey target can be conveyed without locally applying an excessive force to them.

According to the second aspect of the present invention, in the convey apparatus of the first aspect, there is provided an apparatus which further comprising a member for suppressing diameters of the medium passages within a predetermined range.

According to the third aspect of the present invention, in the convey apparatus of the first aspect, there is provided an apparatus which further comprising a member for suppressing a length of the medium passages in a longitudinal direction within a predetermined range.

According to this convey apparatus, the pressures of the medium can be increased, so that a strong carrier wave can be generated.

According to the fourth aspect of the present invention, in the convey apparatus of the first aspect, there is provided an apparatus which further comprising medium pressure holding means for maintaining a pressure of the medium supplied to the medium passages to not less than a predetermined value.

According to this convey apparatus, the pressures of the medium supplied to the respective medium passages are held at a predetermined value or more by the medium pressure holding means. Therefore, a carrier wave free from distortion can be generated without collapsing the medium passages more than necessary.

According to the fifth aspect of the present invention, in the convey apparatus of the first aspect, there is provided an apparatus which further comprising: medium pressure detection means for detecting a pressure of a medium supplied to at least one of the medium passages; and informing means for informing a leak of the medium when the medium pressure detection means detects that a pressure of the medium supplied to at least one medium passage is not more than a predetermined value.

According to this convey apparatus, the pressure of the medium supplied to at least one medium passage, of the respective medium passages, is detected by the medium pressure detection means. When the medium pressure detection means detects that the pressure of the medium is at a predetermined value or less, the informing means informs the medium leak. Hence, medium leaks can be confirmed easily.

According to the sixth aspect of the present invention, in the convey apparatus of the first aspect, there is provided an apparatus which the carrier wave generating means comprises: a housing formed with medium holes for supplying the medium to the medium passages of the convey portion; a shaft rotatably supported in the housing and formed with intake/exhaust holes for performing intake or exhaust of the medium in the medium passages through the medium holes formed in the housing; and driving means for rotating the shaft.

According to this convey apparatus, the shaft is rotated by the driving means, and the medium flowing in the medium passages of the convey portion is taken intake or exhausted through the medium holes formed in the housing and the intake/exhaust holes formed in the shaft, thereby generating a carrier wave.

According to the seventh aspect of the present invention, in the convey apparatus of the sixth aspect, there is provided an apparatus which further comprising relay means for relaying at least one set of the intake/exhaust holes formed in the shaft.

According to this convey apparatus, at least one set of medium holes, of the medium holes formed in the housing, are relayed by the relay means provided to the shaft. As a result, air consumption can be decreased.

According to the eighth aspect of the present invention, in the convey apparatus of the first aspect, there is provided an apparatus which the convey portion comprises: first tubes arranged parallel to each other at a predetermined gap; second tubes extending perpendicular to the first tubes and parallel to each other at a predetermined gap, the second tubes being alternately braided in contact with one circumferential surface portion, or with the other circumferential surface portion opposite to one circumferential surface portion, of each of the first tubes; and contact members arranged on interstices of the first and second tubes and mounted on the first and second tubes, and the medium pressure control means comprises: first medium pressure control means for performing pressure control of a medium supplied to the first tubes; and second medium pressure control means for performing pressure control of a medium supplied to the second tubes.

According to this convey apparatus, pressure control of the medium supplied to the plurality of first tubes arranged parallel to each other at a predetermined gap is performed by the first medium pressure control means, and pressure control of the medium supplied to the second tubes is performed by the second medium pressure control means. Therefore, a carrier wave can be generated in an arbitrary direction.

According to the ninth aspect of the present invention, in the convey apparatus of the first aspect, there is provided an apparatus which the convey portion is divided into a plurality of areas, and further comprises medium valves for stopping a medium supplied to the medium passages of the divided areas.

According to this convey apparatus, the medium which is to be supplied to the medium passage of a portion of the convey portion which is not used can be stopped by the area dividing medium valve provided to each area. Therefore, the medium supplied to the convey portion can be decreased.

According to the tenth aspect of the present invention, there is provided a movable driving mechanism for a movable work apparatus that performs an operation after moving to a target place comprising: tubes mounted around the movable work apparatus to pass a medium therethrough, the tubes having diameters that can be freely enlarged and decreased; supply means for supplying the medium to the tubes; and medium pressure control means for controlling pressures of the medium supplied from the supply means to the tubes and enlarging or decreasing the diameters of the tubes for moving the movable work apparatus.

According to this movable work apparatus, the pressures of the medium supplied to the respective tubes mounted around the movable work apparatus are controlled by the medium pressure control means, thereby increasing or decreasing the diameters of the tubes. Therefore, even if the movable work apparatus is turned upside down during moving, the surface of one of the tubes comes into contact with the movable work apparatus to supply a thrust to it, so that the movable work apparatus can freely travel in a pipe or the like.

According to the eleventh aspect of the present invention, in the movable work apparatus of the tenth aspect, there is provided an apparatus which further comprising medium pressure holding means for maintaining a pressure of the medium supplied to the tubes to not less than a predetermined value.

According to this movable work apparatus, the pressures of the medium supplied to the respective tubes are held at a predetermined value or more by the medium pressure holding means. Accordingly, a carrier wave free from distortion can be generated without collapsing the tubes more than necessary.

According to the twelfth aspect of the present invention, in the movable work apparatus of the tenth aspect, there is provided an apparatus which further comprising: medium pressure detection means for detecting a pressure of the medium supplied to at least one of the tubes; and informing means for informing a leak of the medium when the medium pressure detection means detects that a pressure of the medium supplied to at least one tube is not more than a predetermined value.

According to this movable work apparatus, the pressure of a medium supplied to at least one of the respective tubes is detected by the medium pressure detection means. When the medium pressure detection means detects that the pressure of the medium is at a predetermined value or less, the informing means informs the medium leak. Thus, medium leakage can be confirmed easily.

According to thirteenth aspect of the present invention, in the movable work apparatus of the tenth aspect, there is provided an apparatus which the medium pressure control means comprises: a housing formed with medium holes for supplying the medium to the tubes; a shaft rotatably supported in the housing and formed with intake/exhaust holes for performing intake or exhaust of the medium in the tubes through the medium holes formed in the housing; and driving means for rotating the shaft.

According to this movable work apparatus, the shaft is rotated, and the medium flowing in the medium passages of the convey portion is taken intake or exhausted through the medium holes formed in the housing and the intake/exhaust holes formed in the shaft, thereby generating a carrier wave.

According to the fourteenth aspect of the present invention, in the movable work apparatus of the thirteenth aspect, there is provided an apparatus which further comprising relay means for relaying at least one set of the medium holes formed in the housing.

According to this movable work apparatus, at least one set of medium holes, of the medium holes formed in the housing, are relayed by the relay means provided to the shaft. Consequently, air consumption can be decreased.

According to the fifteenth aspect of the present invention, in the movable work apparatus of the tenth aspect, there is provided an apparatus which the tubes comprise: first tubes mounted around the movable work apparatus to be parallel to each other at a predetermined gap; second tubes extending perpendicular to the first tubes and parallel to each other at a predetermined gap, the second tubes being alternately braided in contact with one circumferential surface portion, or with the other circumferential surface portion opposite to one circumferential surface portion, of each of the first tubes; and contact members arranged on interstices of the first and second tubes and mounted on the first and second tubes, and the medium pressure control means comprises: first medium pressure control means for performing pressure control of a medium supplied to the first tubes; and second medium pressure control means for performing pressure control of a medium supplied to the second tubes.

According to this movable work apparatus, pressure control of the medium supplied to the plurality of first tubes, which are arranged on the circumferential surface portion of the main body of the movable work apparatus substantially parallel to each other at a predetermined gap, is performed by the first medium pressure control means, and pressure control of the medium supplied to the second tubes is performed by the second medium pressure control means. Therefore, the movable work apparatus can be moved in an arbitrary direction.

According to the sixteenth aspect of the present invention, in the movable work apparatus of the tenth aspect, there is provided an apparatus which the tubes are divided into a plurality of areas, and further comprise medium valves for stopping a medium supplied to the tubes of the divided areas.

According to this movable work apparatus, the medium which is to be supplied to tubes in divided areas can be stopped by the area dividing medium valves provided in units of areas. Therefore, the medium supplied to the movable driving mechanism of the movable work apparatus can be decreased.

According to the seventeenth aspect of the present invention, in the movable work apparatus of the tenth aspect, there is provided an apparatus which the tubes comprise: clockwise tubes spirally wound on a portion of a circumferential surface of the movable work apparatus at a predetermined gap clockwise with respect to a traveling direction; and counterclockwise tubes spirally wound on a circumferential surface portion of the movable work apparatus other than the portion of the circumferential surface thereof on which the clockwise tapes are wound, to define a predetermined angle with the clockwise tapes, the counterclockwise tubes being wound at a predetermined gap, and counterclockwise with respect to a traveling direction, and the medium pressure control means comprises: first medium pressure control means for performing pressure control of a medium supplied to the clockwise tubes; and second medium pressure control means for performing pressure control of a medium supplied to the counterclockwise tubes.

According to this movable work apparatus, pressure control of the medium supplied to the clockwise tubes, which are spirally wound at a predetermined gap on a portion of the circumferential surface of the main body of the movable work apparatus clockwise about the traveling direction, is performed by the first medium pressure control means, and pressure control of the medium supplied to the counterclockwise tubes is performed by the second medium pressure control means. Therefore, the movable work apparatus can be moved in an arbitrary direction.

According to the eighteenth aspect of the present invention, in the movable work apparatus of the tenth aspect, there is provided an apparatus which the movable work apparatus comprises units that are connected to each other in series with connecting portions, wherein one unit is swingable relative to the other unit within a predetermined range, and is connected to the other unit to be pivotal within a predetermined range.

According to this movable work apparatus, one unit can swing relative to the other unit within a predetermined range, and is connected to the other unit to be pivotal within a predetermined range. Therefore, the movable work apparatus can be prevented from being twisted more than necessary.

According to the nineteenth aspect: of the present invention, in the movable work apparatus of the tenth aspect, there is provided an apparatus which further comprising: connecting state detection means, provided to the connecting portions, for detecting a connecting state of the connecting portions; mode calculating means for calculating a mode of the movable work apparatus based on the connecting state of the connecting portions detected by the connecting state detection means; and control means for controlling a pressure of the medium based on the mode of the movable work apparatus calculated by the mode calculating means.

According to this movable work apparatus, the connecting state of the respective connecting portions is detected by the connecting state detection means, and the mode of the movable work apparatus is calculated by the mode calculating means based on the connecting state of the respective connecting portions detected by the connecting state detection means.

The pressure of the medium is controlled by the medium pressure control means based on the mode of the movable work apparatus calculated by the mode calculating means. Therefore, the traveling waves in areas before and after a corner portion are controlled separately such that the number of traveling waves is increased before the corner portion and decreased after the corner portion, thereby decreasing the drag acting on the corner portion.

According to the twentieth aspect of the present invention, in the movable work apparatus of the nineteenth aspect, there is provided an apparatus which further comprising: posture detection means, arranged at a distal end portion of the movable work apparatus, for detecting a posture of a distal end of the movable work apparatus; and mode correcting means for correcting the mode of the movable work apparatus calculated by the mode calculating means based on the posture detected by the posture detection means.

According to this movable work apparatus, the posture of the distal end of the main body of the movable work apparatus is detected by the posture detection means, and the mode of the movable work apparatus calculated by the mode calculating means is corrected by the mode correcting means based on the posture detected by the posture detection means. Therefore, the accurate mode of the movable work apparatus can be obtained.

According to the twenty-first aspect of the present invention, in the movable work apparatus of the nineteenth aspect, there is provided an apparatus which further comprising mode display means for displaying the mode of the movable work apparatus based on the mode thereof calculated by the mode calculating means.

According to this movable work apparatus, the mode of the movable work apparatus is displayed by the mode display means based on the mode thereof calculated by the mode calculating means. Therefore, the operator can observe the mode of the movable work apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a side view showing the movable driving mechanism of a conventional movable work apparatus;

FIG. 2 is a side view showing the movable driving mechanism of another conventional movable work apparatus;

FIG. 3A is a perspective view showing the arrangement of a convey apparatus according to the first embodiment of the present invention;

FIG. 3B is a view showing a state of tubes constituting a convey portion;

FIG. 19 is a view showing the entire arrangement of the convey portion of a convey apparatus according to the third embodiment of the present invention;

FIG. 20 is a plan view of a tube group constituting the convey portion of the convey apparatus of the third embodiment;

FIG. 21 is a sectional view of the tube group constituting the convey portion of the convey apparatus of the third embodiment;

FIG. 26 is a view schematically showing the arrangement of a connecting portion that connects the respective units;

FIG. 27 is a view showing the connecting portion of a unit in detail;

DETAILED DESCRIPTION OF THE PREFERRED EMBODIMENTS

Figure 4A:
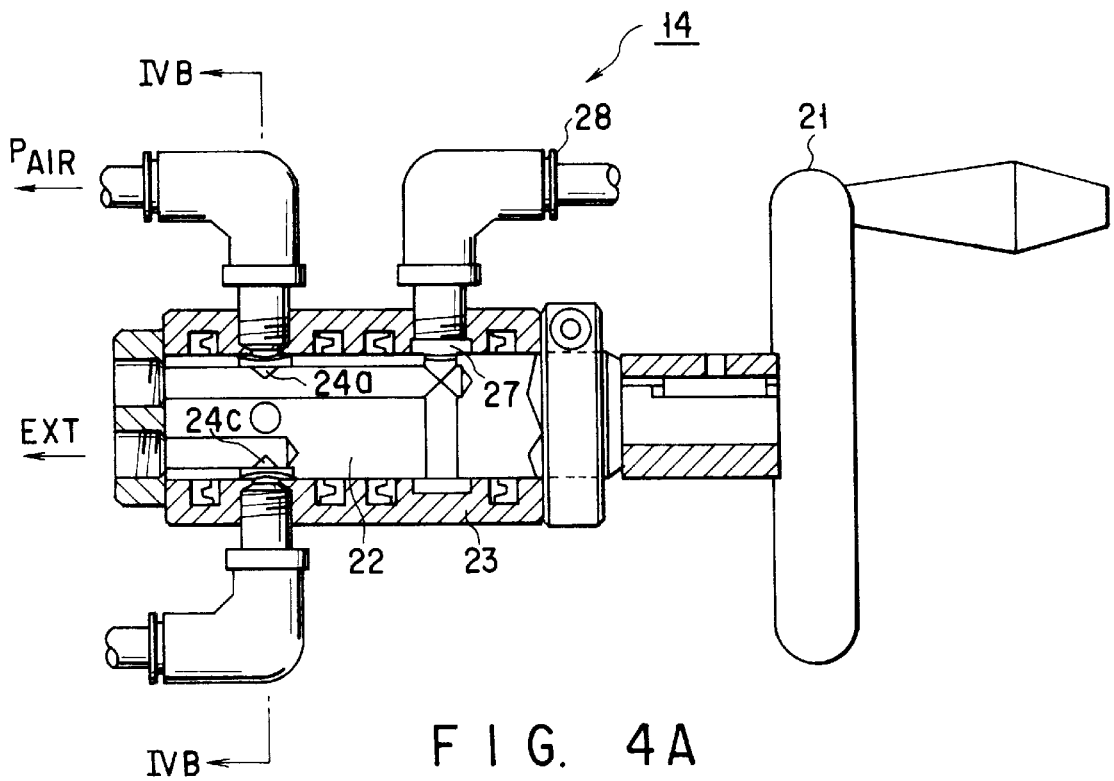
FIG. 4A is a partially sectional view of a medium pressure switching unit taken along the axial direction of its rotary shaft.

The preferred embodiments of the present invention will be described with reference to the accompanying drawings.

FIG. 3A is a perspective view showing the arrangement of a convey apparatus according to the first embodiment of the present invention.

As shown in FIG. 3A, a tube group 11 constituting the convey portion of this convey apparatus is obtained by spreading tubes 12 in a stacked manner.

More specifically, as shown in FIG. 3B, this tube group 11 is constituted by arranging lower tubes 12a on a plate 15 at a predetermined gap and stacking upper tubes 12b between the respective lower tubes 12a arranged on the plate 15 of the convey apparatus.

The lower tubes 12a are mounted on the plate 15. Each upper tube 12b is mounted on two lower tubes 12a adjacent to each other.

Furthermore, the tubes 12a and 12b constituting the tube group 11 are connected to a medium pressure switching unit 14 through medium pipe systems 13. The medium pipe systems 13 are divided into four groups. A medium is regularly circulated to the respective tubes 12 through the medium pipe systems 13, so that the convey surface of the convey portion produces a peristaltic motion.

Figure 4B:
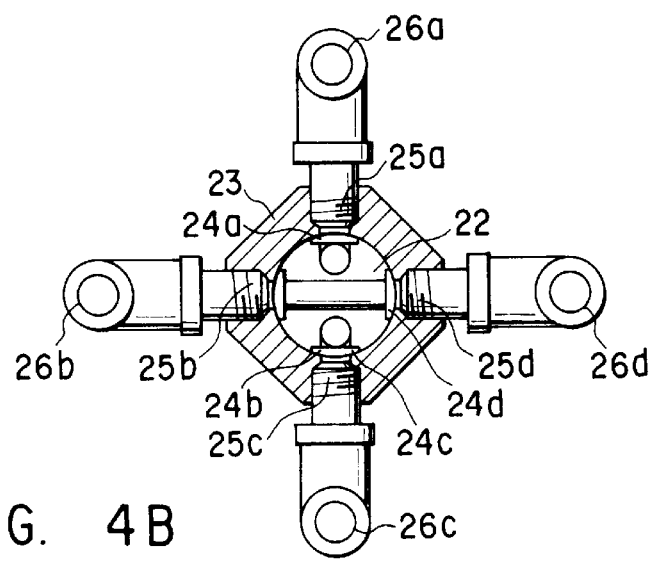
FIG. 4B is a sectional view of the medium pressure switching unit.

FIG. 4A is a partially sectional view of the medium pressure switching unit 14 taken along the axial direction of its rotary shaft, and FIG. 4B is a sectional view of the medium pressure switching unit 14 taken along arrow direction shown in FIG. 4A.

A rotary shaft 22 fixed to a handle 21 is rotatably supported by a housing 23. Ports 24a to 24d for different pressures are provided to the rotary shaft 22.

More specifically, the intake port 24a for the maximum pressure, the exhaust port 24c, and the relay ports 24b and 24d for connecting two groups of medium pipe systems are provided. These ports are arranged such that the pressure circulates in the order of the intake port 24a, the relay port 24b, the exhaust port 24c, and the relay port 24d.

The ports 24a to 24d are respectively connected to medium pipe systems 26a to 26d through outlet ports 25a to 25d of the housing 23. The intake port 24a is normally connected to a pressure port 28 through a normally-open port 27.

The operation of the convey apparatus having the above arrangement will be described.

In a state shown in FIGS. 4A and 4B, the maximum pressure of the pressure port 28 is applied to the intake port 24a, among the respective ports of the medium pressure switching unit 14, through the normally-open port 27 (P=Pmax).

No pressure is applied to the exhaust port 24c open to the outer air (P=0), and the pressure of the relay ports 24b and 24d, to which the pressures of the two groups of medium pipe systems before switching are connected, is the average pressure (P=Pmax/2) of the intake air and exhaust air.

When the handle 21 is rotated to rotate the rotary shaft 22, the ports 24a to 24d for different pressures are sequentially connected to the outlet ports 25a to 25d of the housing 23 while rotating. Accordingly, the pressure P of the medium applied to the tubes connected to the respective medium pipe systems 26a to 26d changes regularly as 0→(Pmax/2)→Pmax→(Pmax/2)→.

The operation of the convey portion, together with the operation of the medium pressure switching unit 14, will be described with reference to FIGS. 5A to 5H.

When the tubes constituting the convey portion are inflated, their diameters increase; when deflated, the diameters decrease. As described above, the tube group 11 is constituted by arranging the lower tubes 12a on the plate 15 at a predetermined gap and stacking the upper tubes 12b between the respective lower tubes 12a arranged on the plate 15. Therefore, the tubes on the surface of the convey portion not only move vertically but also move to the right and left in accordance with the difference in degree of inflation of the lower tubes.

Description will be made concerning the operation of the second tubes 12b shown in FIGS. 5A to 5H as an example.

The medium pressure switching unit 14 applies the maximum pressure Pmax to the first tubes 12a connected to the medium pipe system 26a, and a pressure P=Pmax/2 to the second tubes 12b connected to the medium pipe system 26b and the fourth tubes 12b connected to the medium pipe system 26d. Therefore, the first tubes 12a are largely inflated, and the second 12b and fourth tubes 12b are inflated to a size about half that of the first tubes 12a.

Figure 5A:
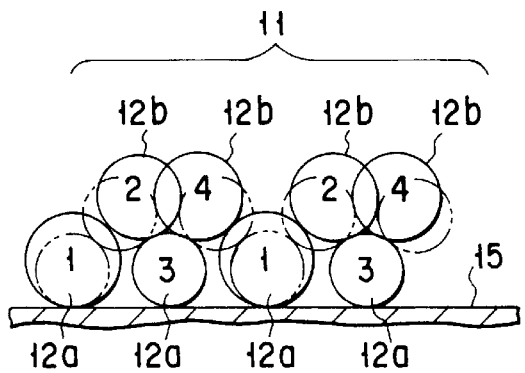
FIG. 5A is a view showing a state of tubes constituting a convey portion.
Figure 5B:
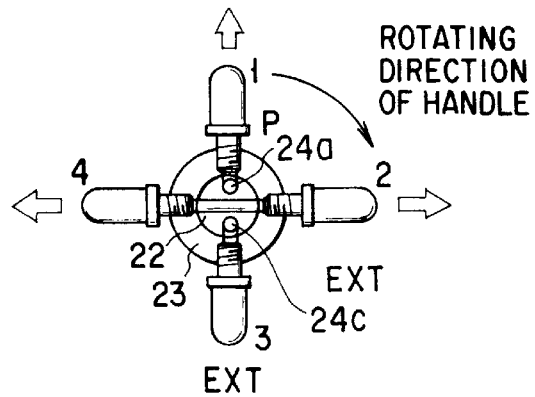
FIG. 5B is a view showing a state of the medium pressure switching unit.

FIG. 5A shows the state of the tubes at this time, and FIG. 5B shows the state of the medium pressure switching unit 14. Thus, the second tubes 12b move to the upper right from the positions shown in FIG. 5G to the positions shown in FIG. 5A along the circumferential surfaces of the third tubes 12a while becoming inflated.

Figure 5C:
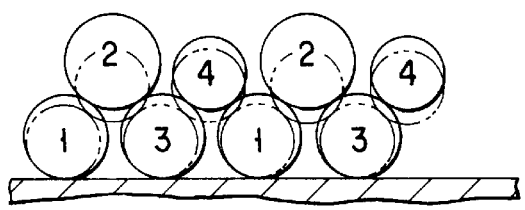
FIG. 5C is a view showing a state of the tubes constituting the convey portion.
Figure 5D:
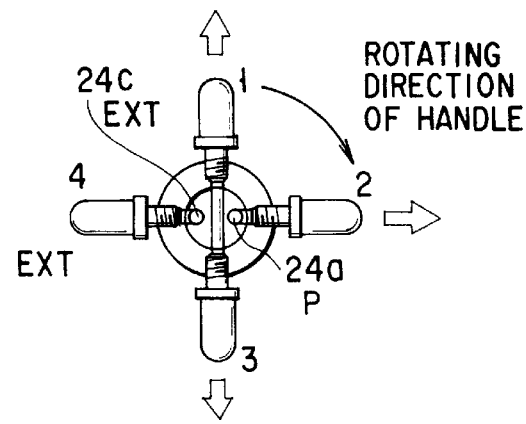
FIG. 5D is a view showing a state of the medium pressure switching unit.

As shown in FIG. 5D, the medium pressure switching unit 14 applies the maximum pressure Pmax to the second tubes 12b connected to the medium pipe system 26b, and the pressure P=Pmax/2 to the first tubes 12a connected to the medium pipe system 26a and the third tubes 12a connected to the medium pipe system 26c. Then, as shown in FIG. 5C, the second tubes 12b are inflated further largely, the first tubes 12a are deflated to a size about half that of the second tubes 12b, and the third tubes 12a are inflated to a size about half that of the second tubes 12b.

Accordingly, the second tubes 12b move from the positions shown in FIG. 5A to the positions shown in FIG. 5C while becoming inflated. At this time, the positions of the second tubes 12b become the highest.

Figure 5E:
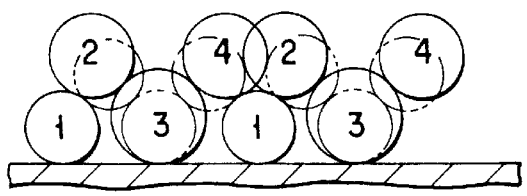
FIG. 5E is a view showing a state of the tubes constituting the convey portion.
Figure 5F:
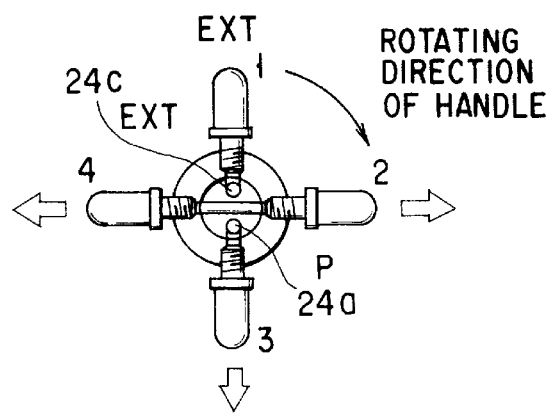
FIG. 5F is a view showing a state of the medium pressure switching unit.

As shown in FIG. 5F, the medium pressure switching unit 14 applies the maximum pressure Pmax to the third tubes 12a connected to the medium pipe system 26c, and the pressure P=Pmax/2 to the second tubes 12b connected to the medium pipe system 26b and the fourth tubes 12b connected to the medium pipe system 26d. As a consequence, as shown in FIG. 5E, the third tubes 12a are inflated further largely, the second tubes 12b are deflated to a size about half that of the third tubes 12a, and the fourth tubes 12b are inflated to a size about half that of the third tubes 12a.

Accordingly, the second tubes 12b move to the lower left from the positions shown in FIG. 5C to the positions shown in FIG. 5E along the circumferential surfaces of the second tubes 12b while becoming deflated.

Figure 5G:
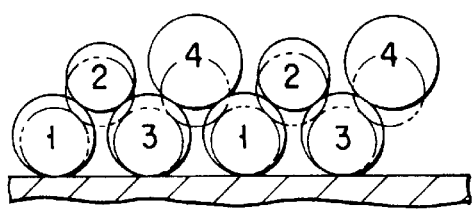
FIG. 5G is a view showing a state of the tubes constituting the convey portion.
Figure 5H:
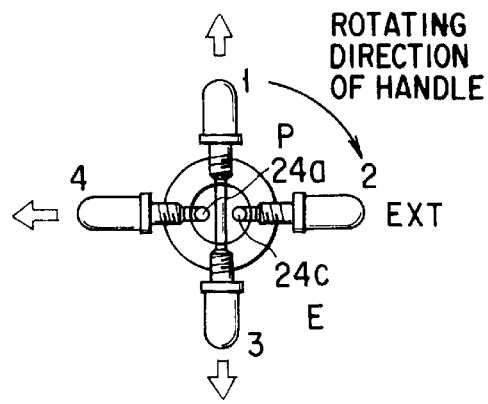
FIG. 5H is a view showing a state of the medium pressure switching unit.

As shown in FIG. 5H, the medium pressure switching unit 14 applies the maximum pressure Pmax to the fourth tubes connected to the medium pipe system 26d, and the pressure P=Pmax/2 to the first tubes 12a connected to the medium pipe system 26a and the third tubes 12a connected to the medium pipe system 26c. Then, as shown in FIG. 5G, the fourth tubes 12b are inflated further largely, the third tubes 12a are deflated to a size about half that of the fourth tubes 12b, and the first tubes 12a are inflated to a size about half that of the fourth tubes 12b.

Accordingly, the second tubes 12b move from the positions shown in FIG. 5E to the positions shown in FIG. 5G while becoming deflated. At this time, the positions of the second tubes 12b become the lowest.

More specifically, the tubes on the surface of the tube group rotate counterclockwise, and as a result, the surface of the tube group makes a rotary swing motion. In the rotary swing motion of the tubes on the surface of the tube group, the operations of the vertices of the adjacent tubes are 180× out of phase. Thus, a peristaltic motion is produced as a whole, and as a result, a carrier wave is generated on the surface of the convey portion.

When an article abuts against and comes into contact with the surface of the tube group that is making a peristaltic motion, a leftward thrust, in this case, acts on the article.

In this embodiment, the handle 21 is mounted in order to rotate the rotary shaft 22. However, in place of the handle 21, a motor or a reduction gear may be mounted, thereby obtaining power.

If the rotating direction of the rotary shaft 22 is changed, the direction of the carrier wave generated on the convey surface of the convey apparatus can be changed, as a matter of course. Also, the driving portion of the convey apparatus of the present invention may be formed into a U-shaped conveyor, so that the convey apparatus can be used for conveyance of agricultural products.

Therefore, according to the convey apparatus of this embodiment, the convey portion of the convey apparatus is formed by stacking the tubes 12, and a pressure is cyclically applied to the tubes 12 through a medium, so that a carrier wave is generated on the surface of the convey portion by a peristaltic motion. Hence, convey targets ranging from a planar one to a three-dimensional one can be conveyed without locally applying an excessive force to them.

Even when the convey portion has a large convey surface, the driving systems can be grouped into four medium pipe systems and a medium pressure switching unit, so that the convey apparatus can be made small with a low profile.

Furthermore, since the convey portion is formed by stacking the tubes 12, even when the convey surface is soft and the convey target is a soft object which is placed on a soft bed, the convey portion can be inserted between the convey target and the soft bed to convey the convey target.

Figure 6A:
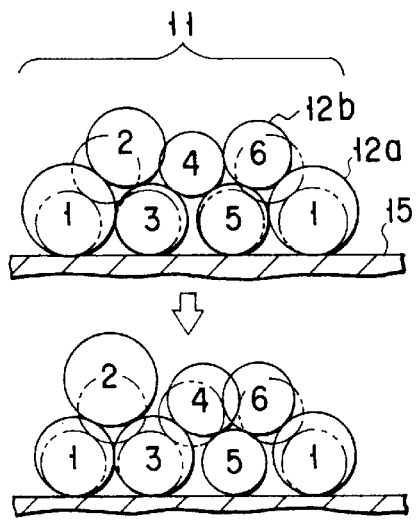
FIG. 6A is a view showing a state of tubes constituting a convey portion.
Figure 6B:
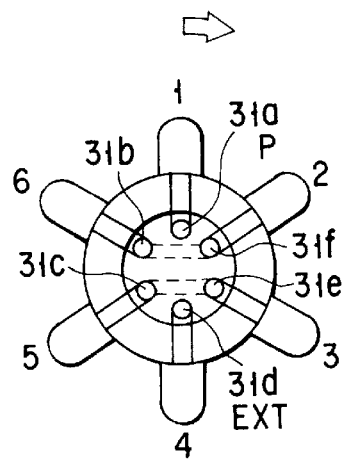
FIG. 6B is a view showing a state of a medium pressure switching unit.

Although the medium pipe systems are divided into four groups in this embodiment, they can be divided into six groups, as shown in FIGS. 6A and 6B. In this case, the medium pressure switching unit is constituted by one intake port 31a, four relay ports 31b, 31c, 31e, and 31f (two sets of connected ports), and one exhaust port 31d.

Figure 7A:
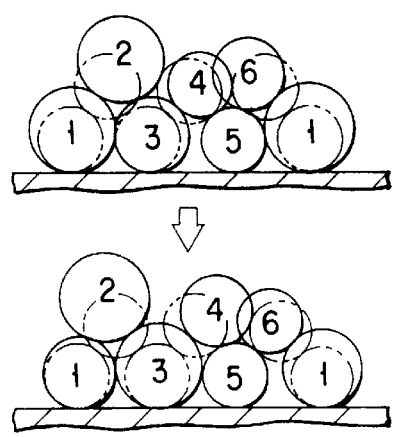
FIG. 7A is a view showing a state of tubes constituting a convey portion.
Figure 7B:
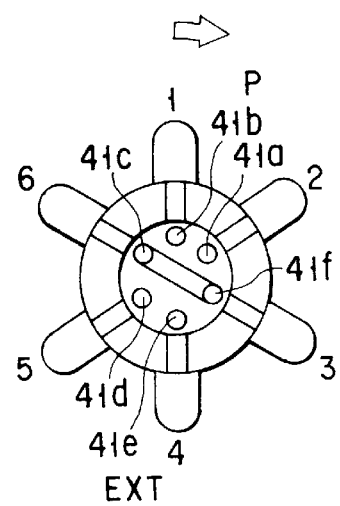
FIG. 7B is a view showing a state of a medium pressure switching unit.
Figure 8A:
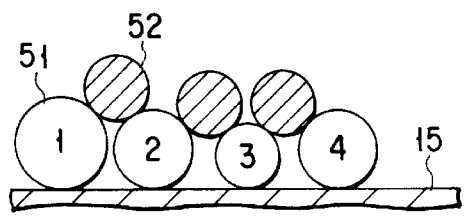
FIG. 8A is a view showing a state of tubes constituting a convey portion.
Figure 8B:
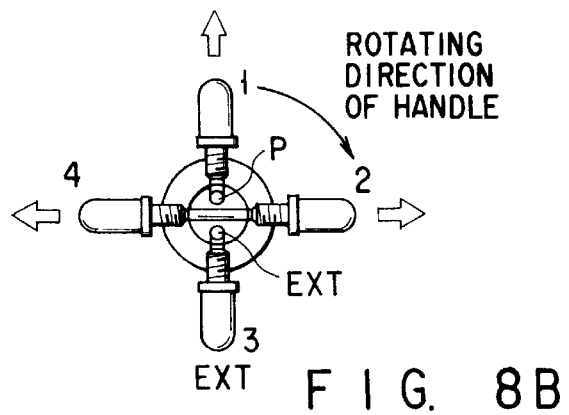
FIG. 8B is a view showing a state of a medium pressure switching unit.
Figure 8C:
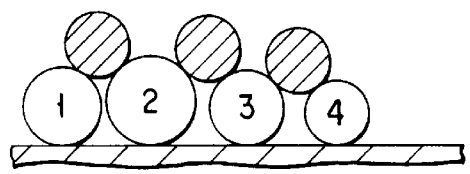
FIG. 8C is a view showing a state of the tubes constituting the convey portion.
Figure 8D:
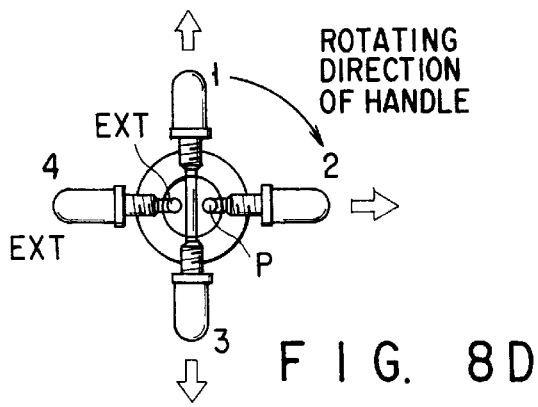
FIG. 8D is a view showing a state of the medium pressure switching unit.
Figure 8E:
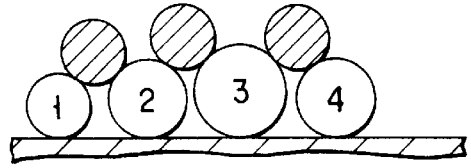
FIG. 8E is a view showing a state of the tubes constituting the convey portion.
Figure 8F:
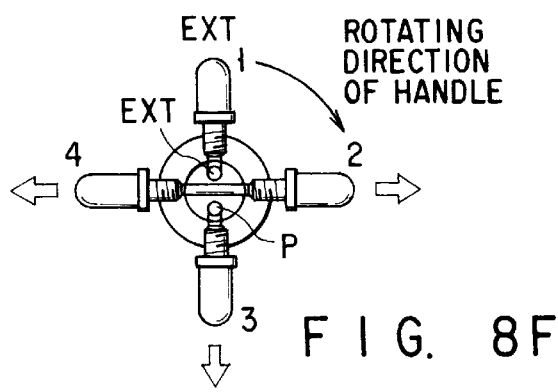
FIG. 8F is a view showing a state of the medium pressure switching unit.
Figure 8G:
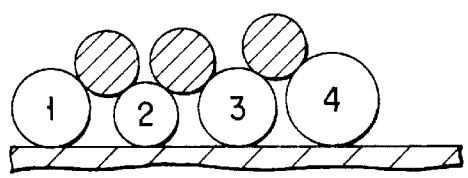
FIG. 8G is a view showing a state of the tubes constituting the convey portion.
Figure 8H:
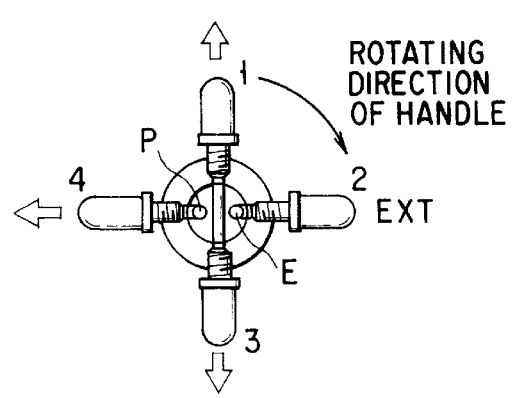
FIG. 8H is a view showing a state of the medium pressure switching unit.

As shown in FIGS. 7A and 7B, the medium pressure switching unit may be constituted by two intake ports 41a and 41b, two relay ports 41c and 41f (one set of connected ports), and two exhaust ports 41d and 41e.

When this arrangement is employed, the wavelength of the carrier wave generated on the convey surface becomes longer and the waves becomes more sparser than in the convey apparatus of the first embodiment described above. Consequently, the thrust transmitted to the convey target becomes smoother.

In the first embodiment, the tubes 12 are arranged at a predetermined gap, and other tubes 12 are stacked among the first tubes, thereby forming a convey surface. However, as shown in FIGS. 8A to 8H, the convey portion of the convey apparatus may be constituted by arranging tubes 51 on a plate at a predetermined gap and stacking elastic rods 52 among the tubes 51.

FIGS. 8A to 8H are views showing the operations of the convey portion and medium pressure switching unit obtained when elastic rods are stacked among tubes.

Even when this arrangement is employed, the surface of the convey portion makes a peristaltic motion, as shown in FIGS. 8A to 8H, thereby conveying a convey target. Since the tube group that forms the convey surface covers only one surface, the connecting portions of the medium pipe systems can be fabricated easily.

Note that the tubes 51 are mounted on a plate 15 and that each elastic rod 52 is mounted on two adjacent tubes 51.

Since the elastic rods 52 are used to form the surface of the convey portion, the durability of the convey apparatus can be improved.

Figure 9:
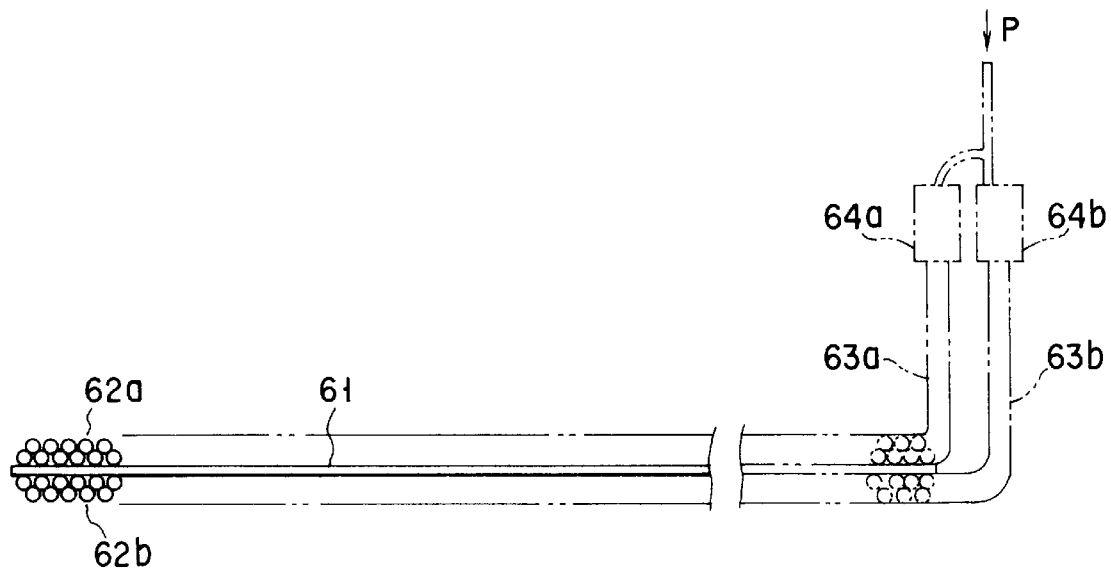
FIG. 9 is a side view of a convey apparatus obtained by mounting tubes to the two sides of a flexible plate.

FIG. 9 is a side view showing the arrangement of a convey apparatus in which tube groups 62a and 62b are mounted on the two surfaces of a flexible plate 61 and medium pressure switching units 64a and 64b are respectively connected to the tube groups 62a and 62b through medium pipe systems 63a and 63b. The flexible plate 61 is strong against compression within a plane and has flexibility in a direction normal to the plane.

The operation of this convey apparatus will be described by way of a case wherein a soft object 72 as a patient lying on a soft bed 71, e.g., a hospital bed, is to be conveyed.

Figure 10A:
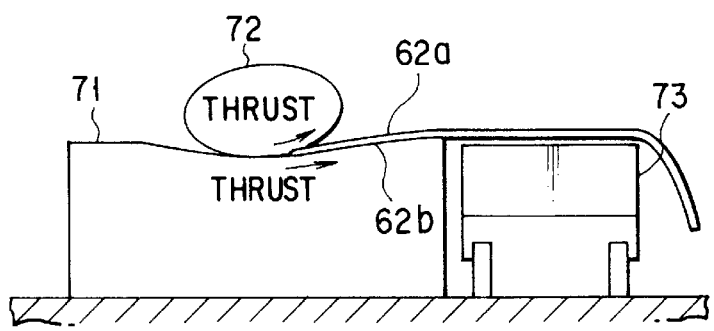
FIG. 10A is a diagram for explaining a state of the convey apparatus.

The medium pressure switching units 64a and 64b apply thrusts to the tube groups 62a and 62b mounted on the two surfaces of the flexible plate 61, so that the flexible plate 61 is inserted between the bed 71 and the patient 72, as shown in FIG. 10A. At this time, as the flexible plate 61, one having such a length that it can extend from the bed 71 to reach a movable truck 73 is used.

Figure 10B:
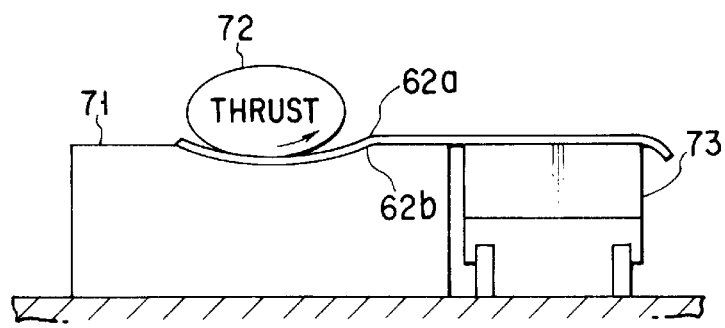
FIG. 10B is a diagram for explaining a state of the convey apparatus.

As shown in FIG. 10B, a thrust is applied to only the tube group 62a mounted on the upper surface of the flexible plate 61 while the tube group 62b mounted on the lower surface of the flexible plate 61 is not moved, thereby transferring the patient 72 from the soft bed 71 onto the movable truck 73.

When the operation described above is performed in the reverse order, the patient 72 can be moved downward from the movable truck 73 to the bed 71.

If the tube groups 62a and 62b mounted on the two surfaces of the flexible plate 61 are mounted such that the thrusts intersect, the convey target can make a translation motion.

Therefore, with the convey apparatus having the above arrangement, labor required for moving a patient who cannot move in a hospital or the like can be decreased. In particular, since the thrusts are applied to both the patient 72 and the bed 71 by the tube groups 62a and 62b mounted on the two surfaces of the flexible plate 61, the flexible plate 61 can be easily inserted between the bed 71 and the patient 72. Thus, the patient 72 need not be lifted up, thereby decreasing the burden of the person aiding the patient 72.

Since the tube groups 62a and 62b mounted on the two surfaces of the flexible plate 61 are thin and soft, even if the patient 72 is on the bed 71, the flexible plate 61 can be inserted between the patient 72 and the bed 71, and no pain will be given to the patient 72 by locally applying an excessive force during the transfer.

Figure 11A:
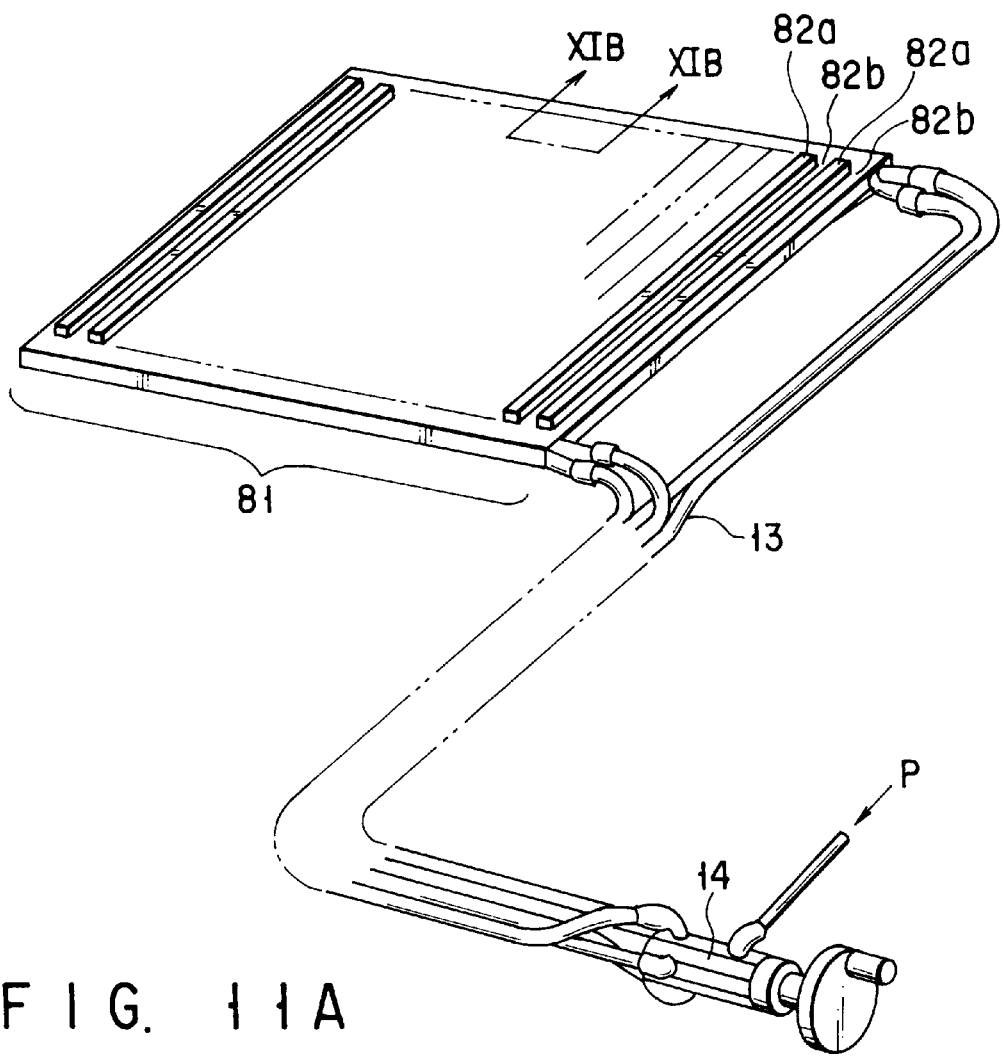
FIG. 11A is a perspective view showing the arrangement of a convey apparatus according to the second embodiment of the present invention.
Figure 11B:
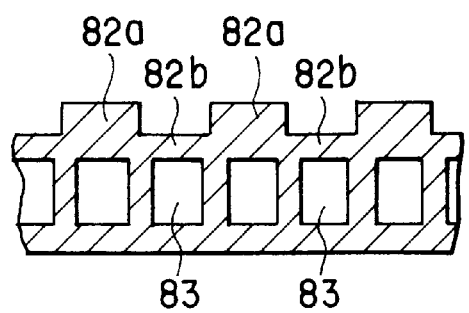
FIG. 11B is a partially sectional view of a convey portion.

FIG. 11A is a perspective view showing the arrangement of a convey apparatus according to the second embodiment of the present invention. FIG. 11B is a partially sectional view of a convey portion. In FIGS. 11A and 11B, the same portions as in FIG. 3 are denoted by the same reference numerals and a detailed description thereof will be omitted. Only portions of FIG. 11A that are different from their counterparts in FIG. 3 will be described.

More specifically, the characteristic feature of the convey apparatus of this embodiment resides not in a convey portion formed by stacking tubes, but in that a convey portion is constituted by an elastic flat body having tall contact portions and tilt portions for tilting the contact portions.

More specifically, as shown in FIG. 11B, an elastic flat body 81 is constituted by alternately forming tall contact portions 82a and tilt portions 82b for tilting the contact portions 82a. Thin holes 83 are formed in the contact portions 82a and tilt portions 82b to pass a medium. The thin holes 83 extend from one side surface of the elastic flat body 81 to the opposite side surface and have rectangular sections.

The respective thin holes 83 of the elastic flat body 81 are connected to a medium pressure switching unit 14 through medium pipe systems 13 divided into four groups, as has been described in the first embodiment.

The operation of the convey apparatus having the above arrangement will be described.

Assume that the maximum pressure of a pressure port 28 acts on an intake port 24a, among the respective ports of the medium pressure switching unit 14 shown in FIGS. 4A and 4B, through a normally-open port 27 (P=Pmax).

No pressure acts on an exhaust port 24c open to the outer air (P=0), and the pressure of relay ports 24b and 24d, to which the pressures of the two groups of the medium pipe systems before switching are connected, is the average pressure (P=Pmax/2) of the intake air and exhaust air.

When a handle 21 is rotated to rotate a rotary shaft 22, the parts 24a to 24d for different pressures are sequentially connected to outlet ports 25a to 25d of a housing 23 while rotating. Accordingly, a pressure P of the medium acting on the thin holes 83 of the elastic flat body 81 that are connected to each respective medium pipe systems 26a to 26d changes regularly as 0→(Pmax/2)→Pmax→(Pmax/2)→.

The operation of the convey portion, together with the operation of the medium pressure switching unit 14 shown in FIGS. 4A and 4B, will be described with reference to FIGS. 12A to 12H.

When the thin holes of the elastic flat body 81 constituting the convey portion are inflated, their diameters increase; when deflated, their diameters decrease.

The elastic flat body 81 is constituted by alternately forming the tall contact portions 82a and the tilt portions 82b for tilting the contact portions 82a, as described above. The thin holes 83 having rectangular sections and passing through the medium are formed in the contact portions 82a and the tilt portions 82b. The thin holes 83 extend from one surface to the opposite side surface of the elastic flat body 81. Therefore, the contact portions 82a on the surface of the convey portion not only move vertically but also move to the right and left in accordance with the difference in degree of inflation of the thin holes 83 in the contact portions 82a and the tilt portions 82b.

Description will be made concerning the operation of the second contact portion 82a shown in FIGS. 12A, 12C, 12E and 12G as an example.

Figure 12A:
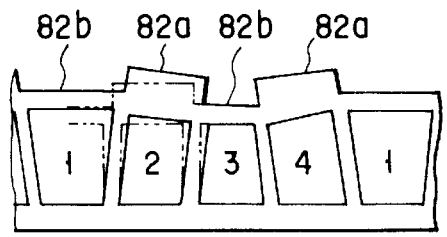
FIG. 12A is a view showing a state of an elastic flat body constituting a convey portion.
Figure 12B:
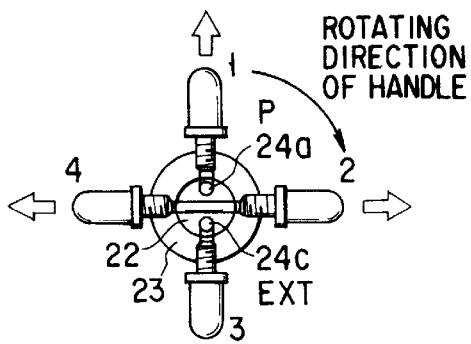
FIG. 12B is a view showing a state of a medium pressure switching unit.

As shown in FIG. 12B, the medium pressure switching unit 14 applies the maximum pressure Pmax to the first tilt portions 82b connected to the medium pipe system 26a, and a pressure P=Pmax/2 to the second contact portions 82a connected to the medium pipe system 26b and the fourth contact portions 82a connected to the medium pipe system 26d.

Therefore, the first tilt portions 82b are largely inflated, and the second and fourth contact portions 82a are inflated to a size about half that of the first tilt portions 82b, as shown in FIG. 12A.

Figure 12C:
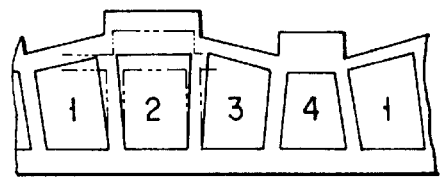
FIG. 12C is a view showing a state of the elastic flat body constituting the convey portion.
Figure 12D:
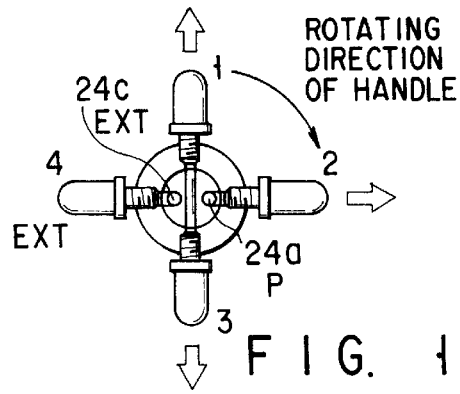
FIG. 12D is a view showing a state of the medium pressure switching unit.
Figure 12E:
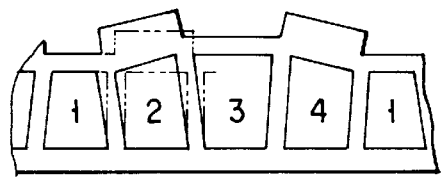
FIG. 12E is a view showing a state of the elastic flat body constituting the convey portion.
Figure 12F:
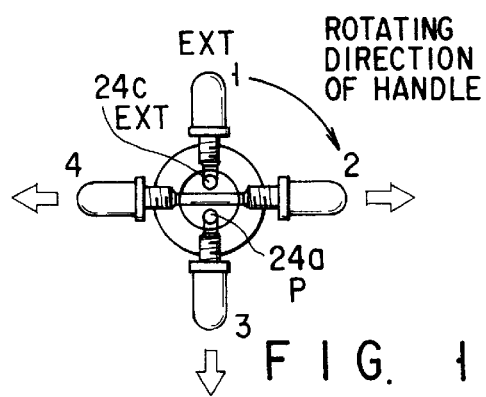
FIG. 12F is a view showing a state of the medium pressure switching unit.
Figure 12G:
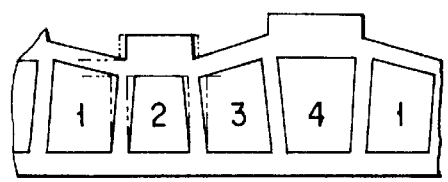
FIG. 12G is a view showing a state of the elastic flat body constituting the convey portion.

Accordingly, the second contact portions 82a tilt to the upper right from the positions shown in FIG. 12G to the positions shown in FIG. 12A while becoming inflated.

As shown in FIG. 12D, the medium pressure switching unit 14 applies the maximum pressure Pmax to the second contact portions 82a connected to the medium pipe system 26b, and the pressure P=Pmax/2 to the first tilt portions 82b connected to the medium pipe system 26a and the third tilt portions 82b connected to the medium pipe system 26c. Then, as shown in FIG. 12C, the second contact portions 82a are inflated further largely, the first tilt portions 82b are deflated to a size about half that of the second contact portions 82a, and the third tilt portions 82b are inflated to a size about half that of the second contact portions 82a.

Accordingly, the second contact portions 82a move from the positions shown in FIG. 12A to the positions shown in FIG. 12C while becoming inflated. At this time, the positions of the second contact portions 82a become the highest.

As shown in FIG. 12F, the medium pressure switching unit 14 applies the maximum pressure Pmax to the third tilt portions 82b connected to the medium pipe system 26c, and the pressure P=Pmax/2 to the second contact portions 82a connected to the medium pipe system 26b and the fourth contact portions 82a connected to the medium pipe system 26d. As a consequence, as shown in FIG. 12E, the third tilt portions 82b are inflated further largely, the second contact portions 82a are deflated to a size about half that of the third tilt portions 82b, and the fourth contact portions 82a are inflated to a size about half that of the third tilt portions 82b.

Accordingly, the second contact portions 82a move to the lower left from the positions shown in FIG. 12C to the positions shown in FIG. 12E while becoming deflated.

Figure 12H:
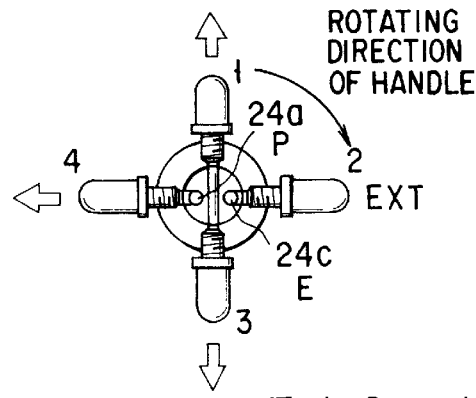
FIG. 12H is a view showing a state of the medium pressure switching unit.

As shown in FIG. 12H, the medium pressure switching unit 14 applies the maximum pressure Pmax to the fourth contact portions 82a connected to the medium pipe system 26d, and the pressure P=Pmax/2 to the first tilt portions 82b connected to the medium pipe system 26a and the third tilt portions 82b connected to the medium pipe system 26c. Hence, as shown in FIG. 12G, the fourth contact portions 82a are inflated further largely, the third tilt portions 82b are deflated to a size about half that of the fourth contact portions 82a, and the first tilt portions 82b are inflated to a size about half that of the fourth contact portions 82a.

Accordingly, the second contact portions 82a move from the positions shown in FIG. 12E to the positions shown in FIG. 12G while becoming deflated. At this time, the positions of the second contact portions 82a become the highest.

More specifically, the contact portions 82a on the surface of the elastic flat body 81 rotate counterclockwise, and as a result, the surface of the elastic flat body 81 makes a rotary swing motion. In the rotary swing motion of the surface of the elastic flat body 81, the operations of the vertices of the adjacent contact portions 82a are 180× out of phase. Thus, the whole surface of the elastic flat body 81 makes a peristaltic motion, and as a result, a carrier wave is generated on the surface of the convey portion.

When an article abuts against and comes into contact with the surface of the elastic flat body 81 that is making a peristaltic motion, a leftward thrust, in this case, acts on the article.

Therefore, even when this arrangement is employed, the same effect as in the first embodiment described above can be obtained.

The medium pressure switching unit of this embodiment can be constituted by only the arrangement of the medium pressure switching unit described in the first embodiment and intake and exhaust ports.

Theoretically, the number of ports can be of any number as far as two or more intake ports are continuously provided and thereafter at least one exhaust port is provided. If only one intake port is provided, the contact portions will not tilt; the contact portions merely move vertically and do not generate a carrier wave.

However, as described in the first embodiment, if a relay port connects portions before and after an intake port, the number of intake ports can be one.

When a relay port is not used, a total of three ports, two intake ports and one exhaust port, are provided, and the number of pipes of the medium pipe systems connected to the ports can be decreased. In this case, the intake number obtained when the medium pressure switching unit performs a 1-cycle operation is three.

The minimum arrangement required when relay ports are used includes a total of four ports, one intake port, one exhaust port, and two relay ports, which is larger by one than the number of ports required when no relay port is used.

In this case, the intake operation count obtained when the medium pressure switching unit performs a 1-cycle operation is four. However, the pressure of the intake air is half and the length of one pipe system in an elastic flat body is ¾ that of a pipe system having no relay ports. If the length of the medium pipe system is neglected, the intake operation count is 4×(¾)×(½)=1.5, thus halving the air consumption.

Figure 13A:
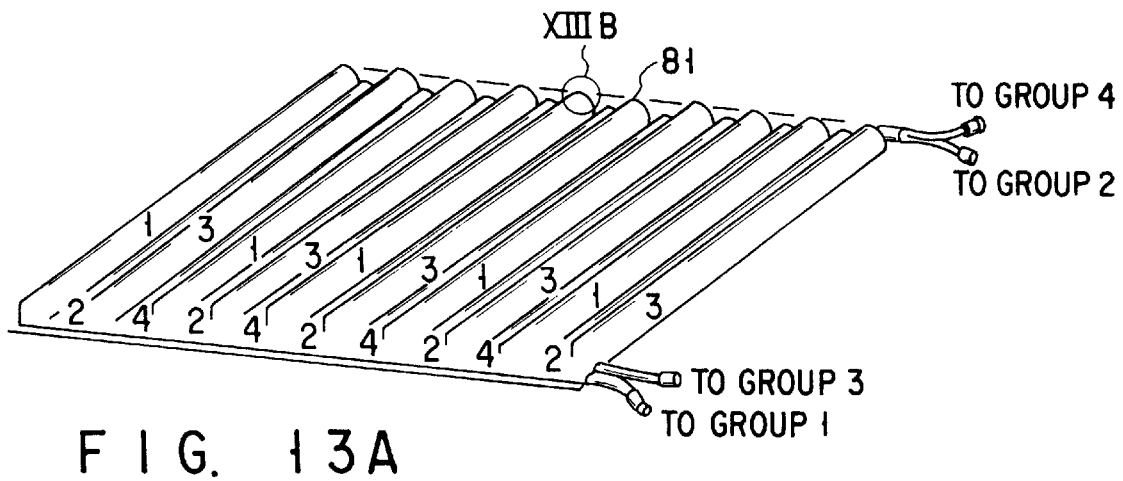
FIG. 13A is a perspective view showing a modification of the elastic flat body of the convey apparatus.
Figure 13B:
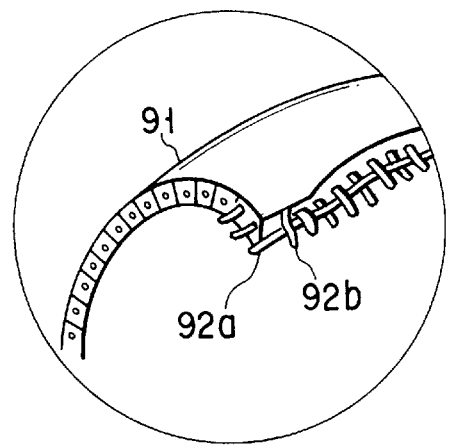
FIG. 13B is a partially sectional view of the elastic flat body.
Figure 14:
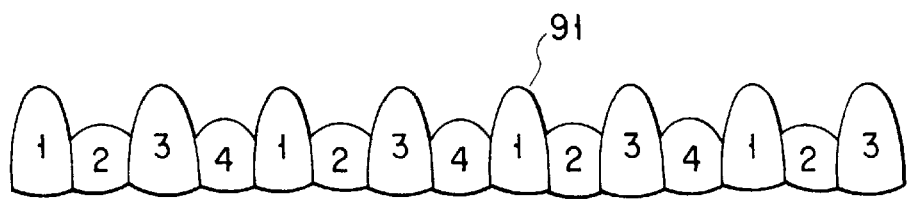
FIG. 14 is a side view of the elastic flat body.

FIG. 13A is a perspective view showing a modification of the elastic flat body of the convey apparatus of this embodiment, FIG. 13B is a partially sectional view of the elastic flat body, and FIG. 14 is a side view of an elastic flat body 81.

As shown in FIGS. 13A, 13B and 14, the characteristic feature of this convey apparatus resides in that the elastic flat body 81 is constituted by an elastic fabric 91. As shown in FIG. 13B, fibers 92a not stretchable in the longitudinal direction of the thin holes and fibers 92b for suppressing the increase in diameter of the thin holes within a predetermined range are braided as reinforcing fibers in the elastic fabric 91.

Therefore, with this convey apparatus, even if the medium pressure is high, since the reinforcing fibers 92a and 92b are braided in the elastic fabric 91, the elastic fabric 91 will not be inflated more than necessary, so that it will not be damaged. Also, since the medium pressure can be increased, a strong peristaltic motion (carrier wave) can be generated.

Furthermore, since the elastic flat body 81 is made of the elastic fabric 91, the fabrication of the convey apparatus can be facilitated.

Figure 15:
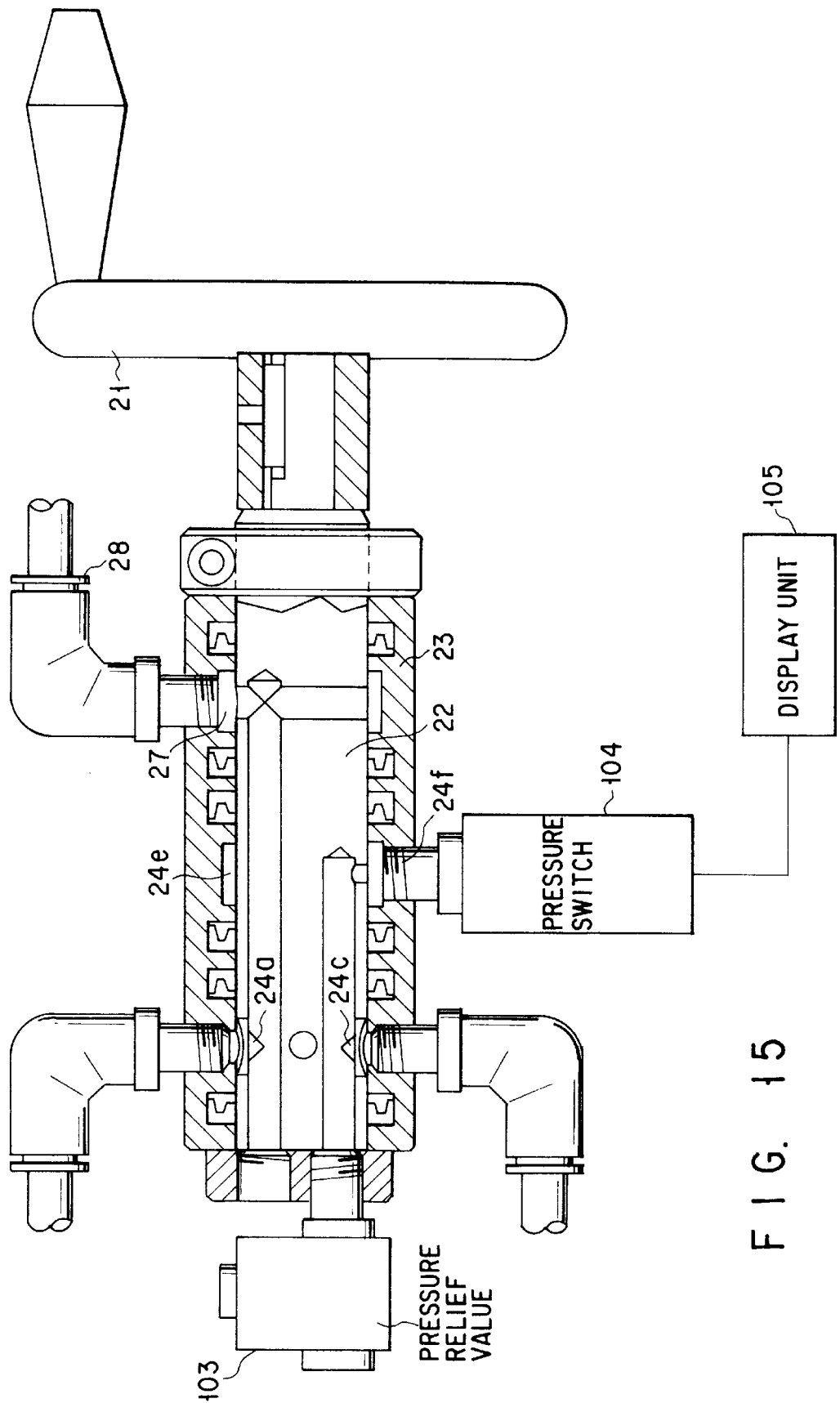
FIG. 15 is a view showing a modification of the medium pressure switching unit.

FIG. 15 shows a modification of the medium pressure switching unit of the convey apparatus of this embodiment. Note that the same portions as in FIGS. 4A and 4B are denoted by the same reference numerals, and a detailed description thereof will be omitted. only portions of FIG. 15 that are different from their counterparts in FIGS. 4A and 4B will be described.

More specifically, the characteristic feature of this medium pressure switching unit resides in that it has a pressure relief valve 103, a pressure switch 104, and a display unit 105.

The pressure relief valve 103 is provided to an exhaust port 24c to adjust the pressure of the medium discharged from the exhaust port 24c to a predetermined value.

The pressure switch 104 is mounted on the exhaust port 24c through a normally-open port 24e and an outlet port 24f to detect whether the pressure of the medium discharged from the exhaust port 24c decreases to a predetermined value Pmin or less. When the pressure switch 104 detects that the medium pressure has decreased to the predetermined value Pmin or less, the display unit 105 displays information indicating the medium leak.

Therefore, in this convey apparatus, the pressure of the medium acting on the respective thin holes of the elastic flat body changes regularly as Pmin→(Pmin+Pmax)/2→Pmax→(Pmin+Pmax)/2.

When the medium leaks from the elastic flat body or the respective medium pipe systems and the pressure switch 104 detects that the pressure of the medium leaking from the exhaust port 24c has decreased to the predetermined value Pmin or less, the display unit 105 displays information indicating the medium leak.

Therefore, according to this convey apparatus, since the discharge pressure of the medium is adjusted by the pressure relief valve 103 so that it will not drop below a predetermined value, the thin holes of the elastic flat body will not collapse more than necessary and a peristaltic motion generates a carrier wave free from distortion (a smooth wave).

Since the pressure switch 104 detects any medium pressure drop to the predetermined value Pmin or less and the display unit 105 displays information indicating the medium leak, medium leaks can be confirmed easily.

This medium pressure switching unit can also be applied to the convey apparatus of the first embodiment described above. Although information indicating a medium leak is displayed on the display unit 105 in this modification, it may be informed by voice or the like.

Figure 16A:
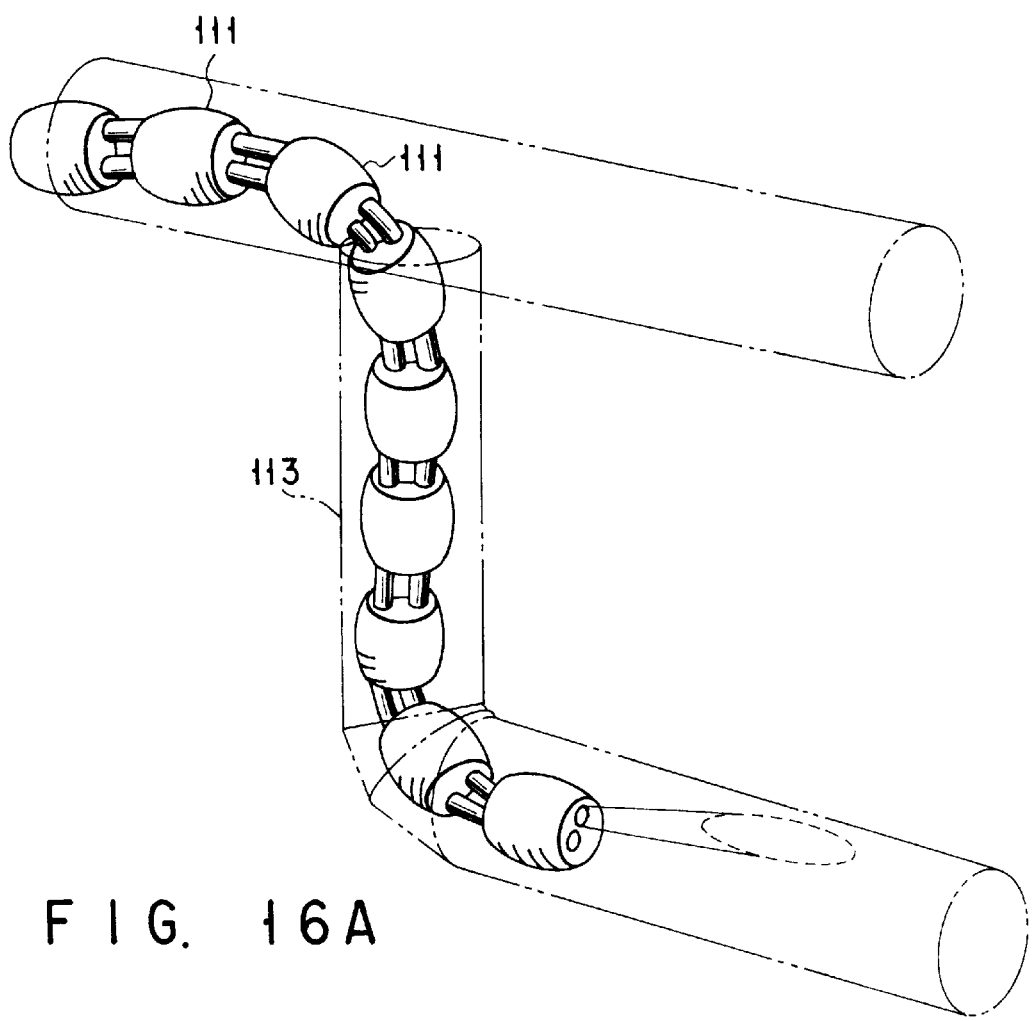
FIG. 16A is a view showing a movable driving mechanism for a movable work apparatus.
Figure 16B:
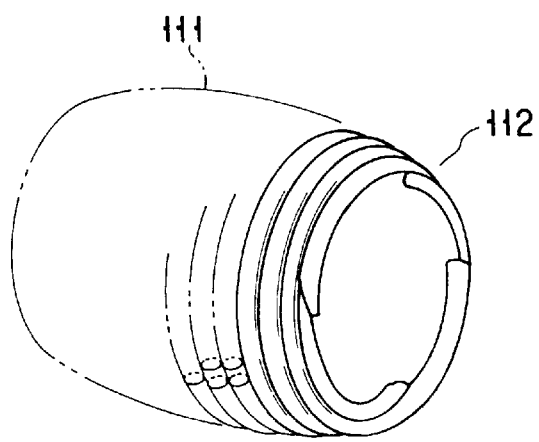
FIG. 16B is a unit constituting a movable work apparatus.

FIG. 16A is a view showing a case in which the convey principle of the above convey apparatus is applied to a movable driving mechanism for a movable work apparatus. FIG. 16B is a unit constituting the movable work apparatus.

As shown in FIG. 16A, this movable work apparatus is constituted by connecting a plurality of units 111 constituting the movable work apparatus in series and spirally applying tubes 112, that are divided into groups, on the surfaces of the respective units 111.

These tubes divided into groups are connected to the medium pressure switching unit described in the above embodiment of the convey apparatus. The pressures of the medium in the respective tubes are switched by driving the medium pressure switching unit.

With this arrangement, even if the movable work apparatus travels down in a pipe 113 and loses its posture balance in the vertical and horizontal directions, since the tubes 112 are wound on the respective units 111, some portion of the movable work apparatus contacts the inner surface of the pipe 113, so that the movable work apparatus can obtain a thrust from this contact portion.

Therefore, according to the movable work apparatus of this embodiment, even if the posture of the movable work apparatus is reversed while moving in a pipe, the movable work apparatus can freely travel in the pipe, eliminating the need for a function of maintaining the posture. Also, since the tubes 112 are wound on the units 111, the movable driving mechanism can be made to have a low profile, so that it can pass a corner portion, e.g., a branching or bent portion of the pipe 113, without being interfered with.

If the pipe of the pressure mediums of the respective units is made common, a common power source for the respective units 111 can be obtained. Then, power required for the switching operation of the pressure medium switching unit is decreased, and the power system can be a small one.

Since a sufficiently large space can be obtained in each unit 111 for mounting the work apparatus, the application field of the movable work apparatus can be widened.

FIGS. 17A to 17D are views showing a modification of the convey portion of the convey apparatus employing tubes described above in the first embodiment.

Figure 17A:
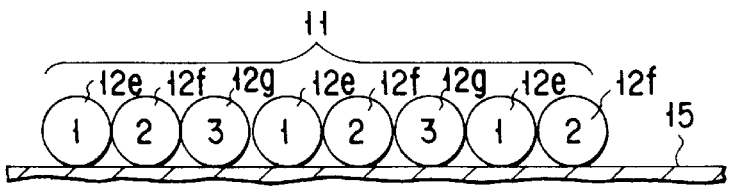
FIGS. 17A to 17D are views showing a modification of a convey portion.

As shown in FIG. 17A, the convey surface of the convey apparatus of this modification is constituted by a tube group 11 obtained by spreading tubes 12e–12g of the same shape. More specifically, the convey surface is entirely constituted by contact portions. The tubes 12e–12g constituting the tube group 11 are connected to a medium pressure switching unit through medium pipe systems. The respective tubes 12e–12g are mounted on a plate 15.

Assume that the medium pipe systems are divided into three groups. These medium pipe systems regularly circulate a medium through the tubes 12, so that the convey surface of the convey portion makes a peristaltic motion.

Figure 24A:
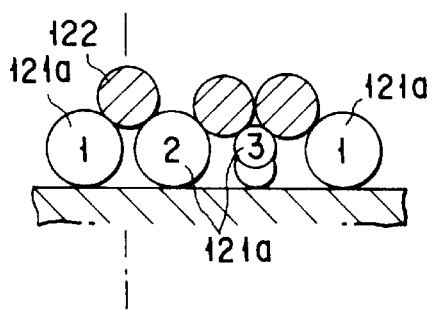
FIG. 24A is a view showing a state of tubes constituting a convey portion.
Figure 24B:
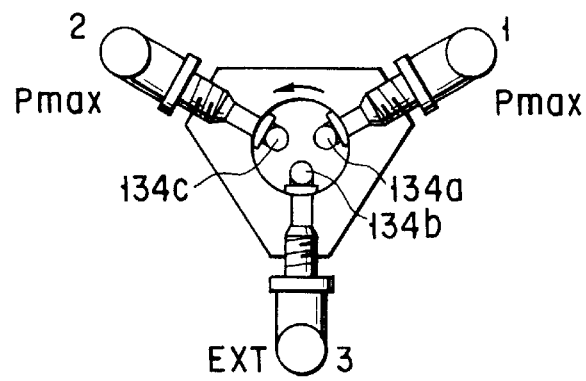
FIG. 24B is a view showing a state of the medium pressure switching unit.

More specifically, two intake ports for supplying the maximum pressure, and one exhaust port are provided to the medium pressure switching unit as shown in FIG. 24B, and intake/exhaust of the respective medium pipe systems is performed through these ports.

The operation of this convey portion will be described.

Figure 17B:
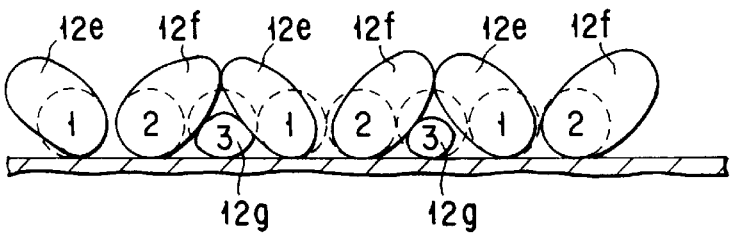

As shown in FIG. 17B, the maximum pressure acts on the first tubes 12e and second tubes 12f. Since the third tubes 12g are connected to the exhaust port open to the outer air, no pressure acts on them.

Figure 17C:
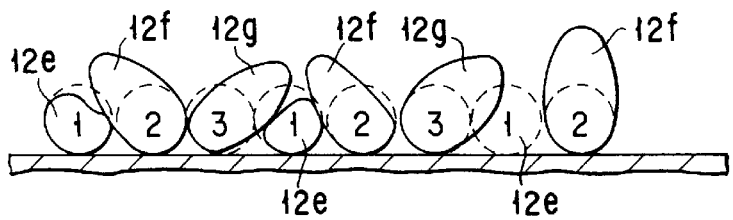

When the handle of the medium pressure switching unit is rotated to rotate a shaft 22, the maximum pressure acts on the second tubes 12f and third tubes 12g, as shown in FIG. 17C. Since the first tubes 12e are connected to the exhaust port open to the outer air, no pressure acts on them.

Figure 17D:
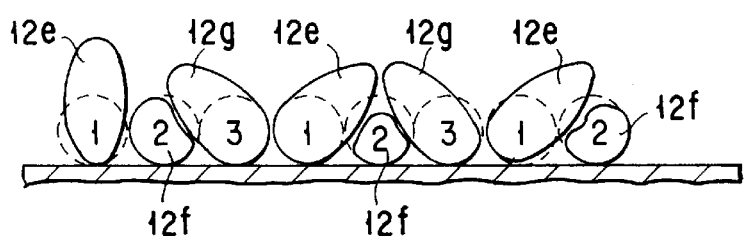

When the handle of the medium pressure switching unit is further rotated to rotate the shaft 22, the maximum pressure acts on the first tubes 12e and third tubes 12f, as shown in FIG. 17D. Since the second tubes 12f are connected to the exhaust port open to the outer air, no pressure acts on them.

Taking, e.g., the vertices (contact portions) of the second tubes 12f as an example, the second tubes 12f are inflated to the upper right, tilt to the upper left in the inflated state, and are deflated downward, thus making a counterclockwise rotary swing motion. The operations of the vertices (contact portions) of the adjacent tubes are 120° out of phase, and the convey surface makes a peristaltic motion as a whole.

FIGS. 18A to 18D are views showing a modification of the convey portion of the convey apparatus employing the elastic fabric described above in the second embodiment.

Figure 18A:
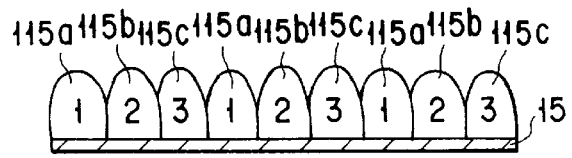
FIGS. 18A to 18D are views showing another modification of the convey portion.

As shown in FIG. 18A, the convey surface of the convey apparatus of this modification is constituted by spreading elastic fabrics of the same shape. More specifically, the convey surface is entirely constituted by contact portions 115a–115c. The elastic fabrics constituting medium passages are connected to a medium pressure switching unit through medium pipe systems. The respective elastic fabrics constituting the contact portions 115a–115c are mounted on a plate 15.

Assume that the medium pipe systems are divided into three groups. These medium pipe systems regularly circulate a medium through the medium passages, so that the convey surface of the convey portion makes a peristaltic motion.

More specifically, two intake ports for supplying the maximum pressure, and one exhaust port are provided to the medium pressure switching unit, and intake/exhaust of the respective medium pipe systems is performed through these ports.

The operation of this convey portion will be described.

Figure 18B:
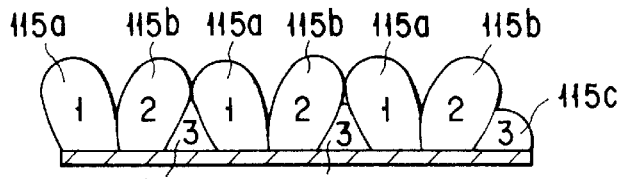

As shown in FIG. 18B, the maximum pressure acts on the first elastic fabrics 115a and second elastic fabrics 115b. Since the third elastic fabrics 115c are connected to the exhaust port open to the outer air, no pressure acts on them.

Figure 18C:
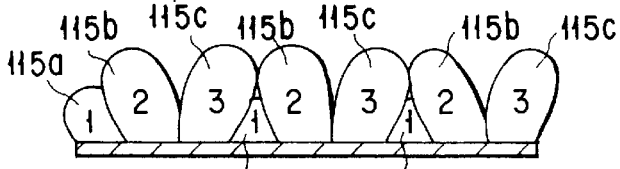

When the handle of the medium pressure switching unit is rotated to rotate a shaft 22, the maximum pressure acts on the second elastic fabrics 115b and third elastic fabrics 115c, as shown in FIG. 18C. Since the first elastic fabrics 115a are connected to the exhaust port open to the outer air, no pressure acts on them.

Figure 18D:
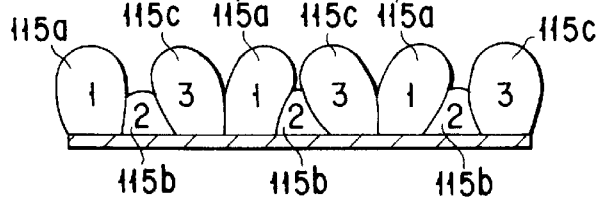

When the handle of the medium pressure switching unit is further rotated to rotate the shaft 22, the maximum pressure acts on the first elastic fabrics 115a and third elastic fabrics 115c, as shown in FIG. 18D. Since the second elastic fabrics 115b are connected to the exhaust port open to the outer air, no pressure acts on them.

Taking, e.g., the vertices (contact portions) of the second elastic fabrics as an example, the second elastic fabrics 115b are inflated to the upper right, tilt to the upper left in the inflated state, and are deflated downward, thus making counterclockwise rotary swing motion. The operations of the vertices (contact portions) of the adjacent elastic fabrics are 120° out of phase, and the convey surface makes a peristaltic motion as a whole.

Therefore, even if the convey surface is entirely constituted by the contact portions, the same effect as in the first embodiment described above can be obtained. Since the convey surface is constituted by the elastic fabrics of the same shape, the manufacture of the convey surface is facilitated.

FIG. 19 is a view showing the entire arrangement of the convey portion of a convey apparatus according to the third embodiment of the present invention.

FIG. 20 is a plan view of a tube group constituting the convey portion of the convey apparatus of the third embodiment, and FIG. 21 is a sectional view of the tube group constituting the convey portion of the third embodiment.

As shown in FIGS. 19 to 21, a tube group 121 constituting the convey portion of this convey apparatus is obtained by spreading vertical tubes 121a and horizontal tubes 121b by braiding, and stacking contact members 122 made of, e.g., elastic spherical bodies, on the interstices extending over the vertical and horizontal tubes 121a and 121b.

The contact members 122 arranged on the interstices of the vertical and horizontal tubes 121a and 121b are mounted on the these tubes 121a and 121b. The contact members 122 need not be elastic bodies, and their shapes are not limited to spherical ones but can be quadrangular ones.

The convey portion is divided into a plurality of areas. The vertical and horizontal tubes 121a and 121b constituting the tube group 121 of each divided area are connected to medium pressure switching units 124a and 124b, and 124c and 124d through medium pipe systems 123, respectively.

The medium pipe systems 123 are divided into three groups, and the medium is regularly circulated through the vertical or horizontal tubes 121a or 121b through the respective medium pipe systems 123, so that the convey surface of the convey portion makes a peristaltic motion.

Furthermore, area dividing medium valves 125a to 125d for stopping the medium from being supplied to the tubes of the divided areas are provided midway along the medium pipe systems 123 in units of areas.

Figure 22:
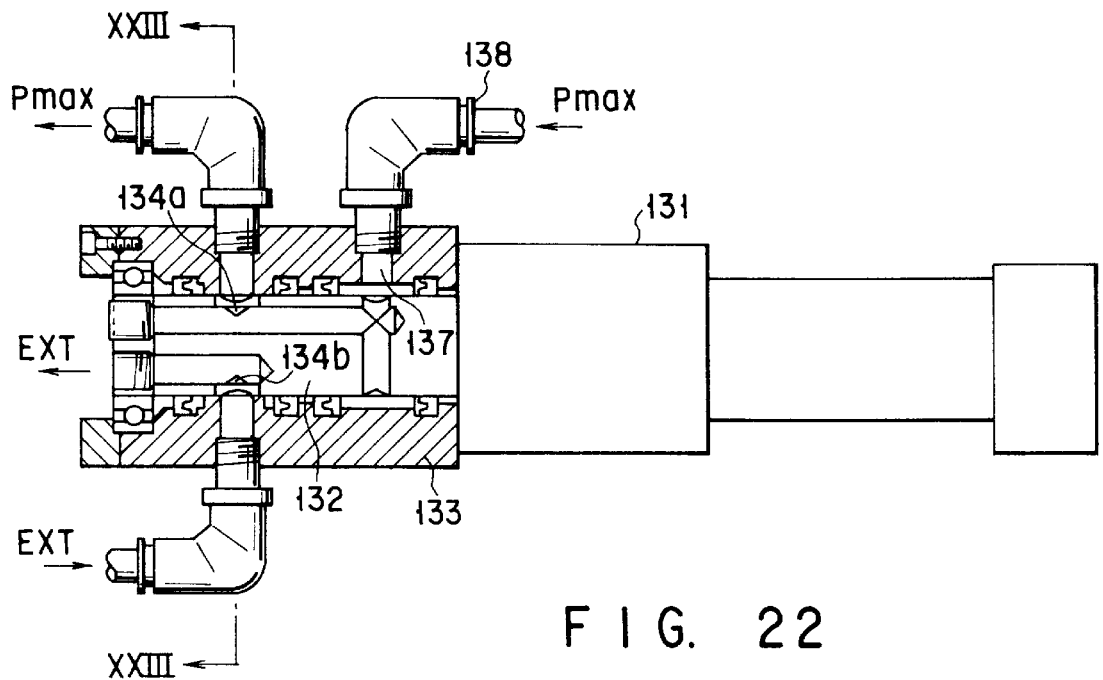
FIG. 22 is a partially sectional view of a medium pressure switching unit taken along the axial direction of its rotary shaft.
Figure 23:
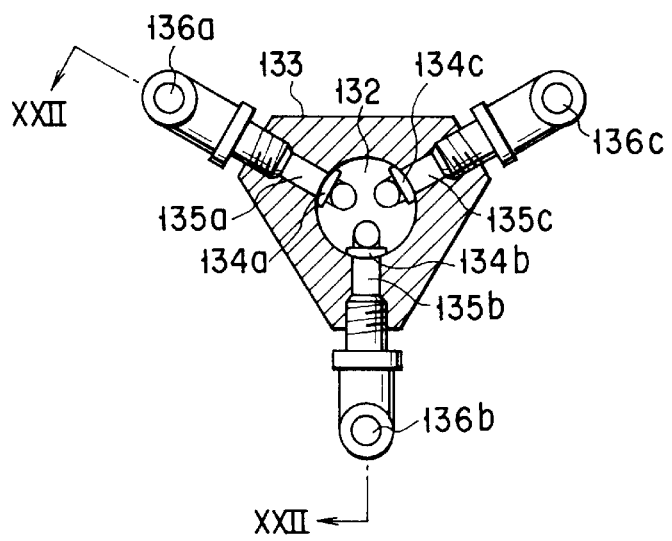
FIG. 23 is a sectional view of the medium pressure switching unit.

FIG. 22 is a partially sectional view of the medium pressure switching unit taken along the axial direction of the rotary shaft, and FIG. 23 is a sectional view taken along arrow shown in FIG. 22 of the medium pressure switching unit.

As shown in FIGS. 22 and 23, a rotary shaft 132 connected to an air motor, an electric motor, or a driving unit 131 obtained by adding a reduction gear to an air motor or an electric motor is rotatably supported by a housing 133.

Three ports 134a to 134c for different pressures are provided to the rotary shaft 132.

More specifically, two intake ports 134a and 134b for the maximum pressure and one exhaust port 134c are provided.

These ports 134a to 134c are connected to medium pipe systems 136a to 136c through outlet ports 135a to 135c of the housing 133. The intake ports 134a and 134b are normally connected to a pressure port 138 through a normally-open port 137.

The operation of the convey apparatus having the above arrangement will be described.

In the state shown in FIGS. 22 and 23, the maximum pressure of the pressure port 138 acts on the two intake ports 134a and 134b, among the respective ports of the medium pressure switching unit, through the normally-open port 137 (P=Pmax).

No pressure acts on the exhaust port 134c open to the outer air (P=0).

When the rotary shaft 132 is rotated by the driving unit 131, the ports 134a to 134c for different pressures are sequentially connected to the outlet ports 135a to 135c of the housing 133 while rotating.

Accordingly, a pressure P of the medium acting on the tubes connected to the medium pipe systems 136a to 136c changes regularly as Pmax→Pmax→0→.

The operation of the convey portion, together with the operation of the medium pressure switching unit, will be described with reference to FIGS. 24A to 24F. Note that in FIGS. 24A, 24C, and 24E, only the vertical tubes 121a are shown for the sake of descriptive convenience and the horizontal tubes 121b are omitted.

When the tubes constituting the convey portion are inflated, their diameters increase; when deflated, the diameters decrease. The tube group 121 is constituted by arranging the tubes at a predetermined gap on a plate and stacking the contact members 122 on the interstices of the vertical and horizontal tubes 121a and 121b, as described above. Therefore, the tubes on the surface of the convey portion not only move vertically but also move horizontally in accordance with the difference in degree of inflation of the tubes of the lower tubes.

Description will be made concerning the operation of the contact members 122 shown in FIGS. 24A, 24C, and 24E as an example.

As shown in FIG. 24B, the medium pressure switching unit exerts the maximum pressure Pmax to the first elastic tubes 121a and second elastic tubes 121a connected to the medium pipe systems 136a and 136c, so that the first elastic tubes 121a and second elastic tubes 121a are inflated.

Figure 24C:
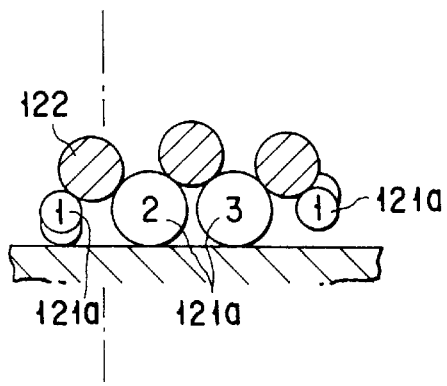
FIG. 24C is a view showing a state of the tubes constituting the convey portion.
Figure 24D:
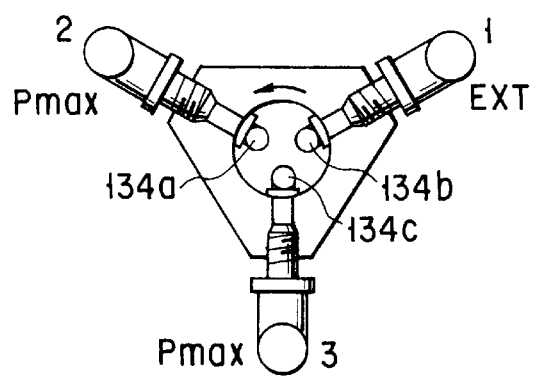
FIG. 24D is a view showing a state of the medium pressure switching unit.
Figure 24E:
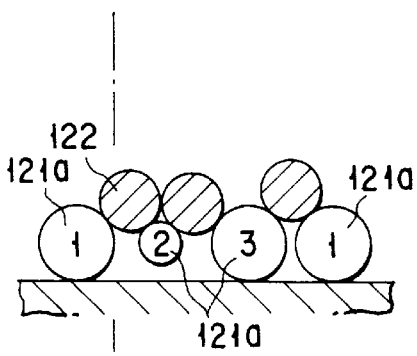
FIG. 24E is a view showing a state of the tubes constituting the convey portion.

Therefore, the contact members 122 are lifted from the positions shown in FIG. 24E to the positions shown in FIG. 24A.

As shown in FIG. 24D, the medium pressure switching unit applies the maximum pressure Pmax to the second elastic tubes 121a and third elastic tubes 121a connected to the medium pipe systems 136a and 136b. Hence, the second tube 21a and the third tube 3 are inflated, as shown in FIG. 24C, and the first tubes connected to the medium pipe system 136c are exhausted and deflated.

Therefore, the contact members 122 move to the lower left from the positions shown in FIG. 24A to the positions shown in FIG. 24C.

Figure 24F:
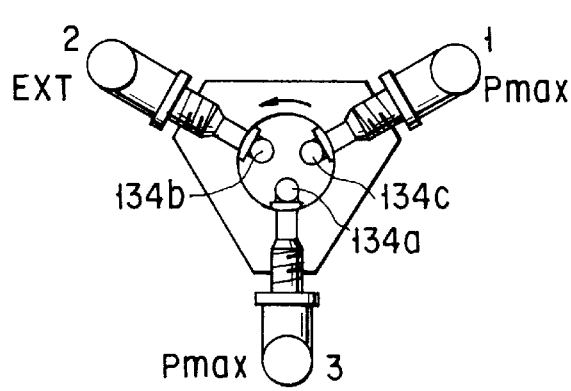
FIG. 24F is a view showing a state of the medium pressure switching unit.

As shown in FIG. 24F, the medium pressure switching unit applies the maximum pressure Pmax to the third elastic tubes 121a and first elastic tubes 121a connected to the medium pipe systems 136c and 136b. Thus, as shown in FIG. 24E, the first elastic tubes 121a and third elastic tubes 121a are inflated, and the second tube connected to the medium pipe system 136a is exhausted and deflated.

Accordingly, the contact members 122 move to the lower right from the positions shown in FIG. 24C to the positions shown in FIG. 24E.

More specifically, the contact members 122 on the surface of the tube group rotate counterclockwise, and as a result, the surface of the tube group makes a rotary swing motion. In the rotary swing motion of the contact members 122 on the surface of the tube group, the adjacent contact members are 120° out of phase. Thus, the whole surface of the tube group makes a peristaltic motion, and as a result, a carrier wave is generated on the surface of the convey portion.

When an article abuts against and comes into contact with the surface of the tube group that is making a peristaltic motion, a leftward thrust, in this case, acts on the article.

If the rotating direction of the rotary shaft 132 is changed, the direction of the carrier wave generated on the convey surface of the convey apparatus can be changed, as a matter of course.

As described above, the tube group 121 is constituted by spreading the vertical tubes 121a and horizontal tubes 121b by braiding, and stacking the contact members 122 made of, e.g., elastic spherical bodies, on the interstices extending over the vertical and horizontal tubes 121a and 121b.

In this case, since the direction of the carrier wave can be arbitrarily set by moving the medium pressure switching units 124a and 124b of the vertical tubes 121a and the medium pressure switching units 124c and 124d of the horizontal tubes 121b separately, a convey target can be conveyed in an arbitrary direction.

Furthermore, in this embodiment, the convey portion is divided into areas, and separate medium pressure switching units (124a, 124b), (124c, 124d) are provided to the respective areas. Therefore, if the switching speed of the medium pressure switching unit 124a (124c) in the front-side area in the traveling direction of the convey article is set higher than that of the medium pressure switching unit 124b (124d) in the rear-side area, when one side of a long convey article gets on the front-side area of the convey portion the first, the long convey article moves forward leaving its other side on the rear-side area. Therefore, the longitudinal direction of the long convey article can be corrected in the convey direction.

Furthermore, in this embodiment, the convey portion is divided into areas midway along the medium pipe systems 123, and the area dividing medium valves 125a to 125d are provided to the areas in order to stop intake/exhaust of the medium from/to the intake ports of the respective areas. Therefore, if in take/exhaust of the medium to a portion where the convey article does not exist is stopped, the capacity of the convey portion necessary for injecting the medium can be decreased.

Accordingly, in this embodiment, when the vertical and horizontal tubes 121a are moved separately, a synthetic carrier wave obtained by combining the respective carrier waves can be generated. Since the direction of the carrier wave can be set arbitrarily, a convey article can be conveyed in an arbitrary direction.

When this arrangement is employed as a movable driving mechanism for a movable work apparatus, since a driving force can be generated in any direction, the movable work apparatus can travel transversely or obliquely, so that it can instantaneously switch its direction without requiring the steering time of the wheels.

In this embodiment, the posture (rotating direction) of the convey article can also be corrected by dividing the convey portion into areas and changing the switching speeds of the medium pressure switching units of the respective areas. When this arrangement is employed as a movable driving mechanism for a movable work apparatus, the movable work apparatus can pivot freely.

Furthermore, in this embodiment, since the area dividing medium valves 125a to 125d are provided, if intake/exhaust of the medium to/from, e.g., a portion where the convey article does not exist is stopped, the injection capacity of the medium to the convey portion can be decreased, thereby decreasing the medium consumption.

In accordance with the decrease in capacity, the pressure saturation time of the medium pressure is shortened. Thus, even if the switching speeds of the medium pressure switching units are increased, a traveling wave can be generated.

Figure 25:
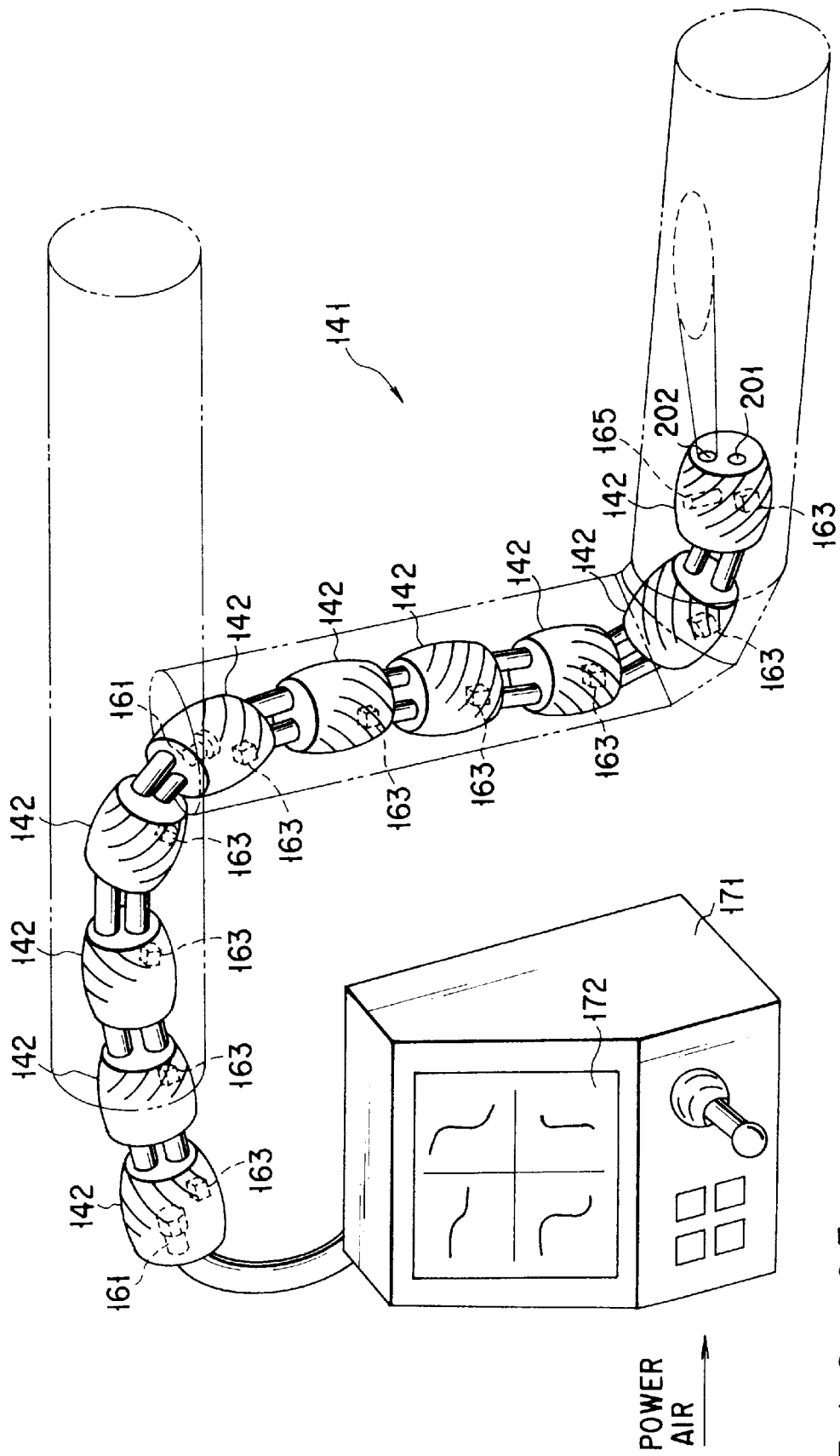
FIG. 25 is a view showing the arrangement of a movable driving mechanism for a movable work apparatus according to the second embodiment of the present invention.

FIG. 25 is a view showing the arrangement of a movable driving mechanism for a movable work apparatus in a pipe according to the second embodiment of the present invention.

As shown in FIG. 25, this movable work apparatus 141 is constituted by connecting a plurality of units 142 in series.

Tubes divided into groups are spirally wound on the surfaces of the respective units 142 clockwise or counterclockwise, the unit on which tubes are wound clockwise and the unit on which tubes are wound counterclockwise constitute one set.

The connecting portions for connecting the respective units 142 have a torsional flexing function that allows pivot and swing up to a predetermined angle.

FIG. 26 is a view schematically showing the arrangement of a connecting portion connecting the respective units 142, and FIG. 27 is a view showing the connecting portion of a unit 142 in detail.

As shown in FIGS. 26 and 27, the units 142 are connected to each other with a shaft 151, and this shaft 151 is supported by spherical joints 152. A screw groove is formed on the distal ends of this shaft 151, and the shaft 151 is fixed by nuts 153.

The spherical joints 152 are supported by the corresponding units 142 with holding members 154 and screws 155.

A coil spring 156 is loosely fitted on the shaft 151, rod bodies 157 are mounted on the shaft 151, and the pivot angle of the shaft 151 is restricted by stoppers 158 mounted on each unit 142.

An air compressor for actively changing the flexing angle of the connecting portion is mounted on the connecting portion at the distal end of the main body of the movable work apparatus 141.

Figure 28:
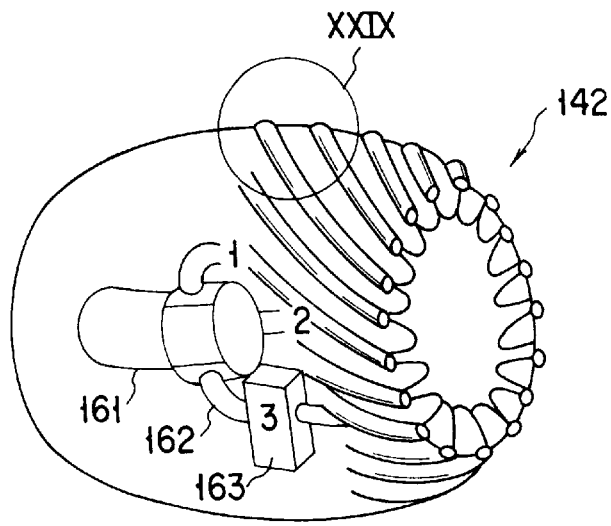
FIG. 28 is a view showing the arrangement of a unit.

FIG. 28 shows the arrangement of the unit 142.

As shown in FIG. 28, the tubes are wound on the surface of the unit 142 in a predetermined direction, and these tubes are divided in units of areas. These tubes are connected to a medium pressure switching unit 161 as shown in FIGS. 4A and 4B provided to each unit through a medium pipe system 162 and an area dividing medium valve 163.

Air is supplied from a state detector 171 to the medium pressure switching unit 161 provided to each unit through an air supply pipe. The medium pressure switching unit 161 and the tubes are connected with an arrangement identical to that described in reference to the above convey apparatus. The medium pressure switching unit 161 has a function similar to that of the medium pressure switching unit described in reference to the above convey apparatus. A function similar to that of the display unit shown in FIG. 15 is realized by the state detector 171. For example, when it is detected that the pressure of the medium detected by the medium pressure switching unit 161 provided to each unit is equal to a predetermined value or less, information indicating the medium leak is displayed on a monitor 172 of the state detector 171.

Figure 29:
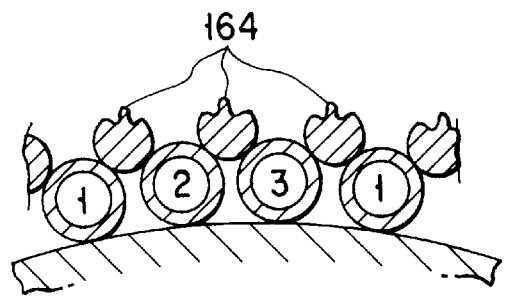
FIG. 29 is an enlarged view of a portion XXIX shown in FIG. 28.

FIG. 29 is an enlarged view of a portion XXIX shown in FIG. 28.

As shown in FIG. 29, contact members 164 made of elastic rod-shaped members are stacked between the tubes wound on the surface of the unit; 142. These contact members 164 are mounted on the tubes.

Grooves or ridges are formed on the surfaces of the contact members 164 to extend in the longitudinal direction. The grooves or ridges serve as a resistance in a direction perpendicular to the tubes but allow slippage in the longitudinal direction of the tubes, thus enabling efficient movement.

As shown in FIG. 25, a clinometer 165 for detecting the posture is loaded on the distal end of the main body of the movable work apparatus, and a connecting state detector is mounted on the connecting portion of each unit to detect the flex angle and torsional angle of the connecting portion.

As shown in FIG. 27, this connecting state detector is constituted by a quadrangular target 191 on the extending axis of the shaft 151 and distance sensors for detecting the position and posture of this target 191.

Figure 30:
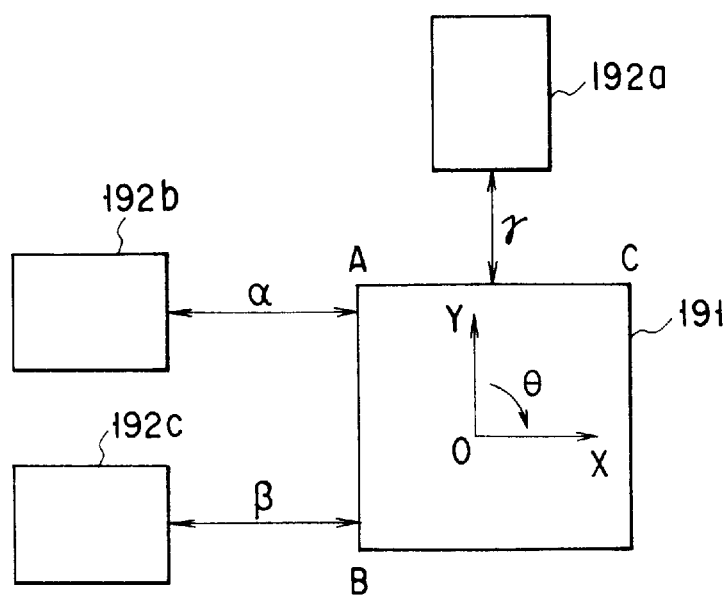
FIG. 30 is a view seen from the direction of an arrow A of FIG. 27.

FIG. 30 is a view seen from the direction of an arrow A of FIG. 27.

Two distance sensors 192b and 192c measure distances $\alpha$ and $\beta$ to a side AB of the target 191. A distance sensor 192a measures a distance $\gamma$ to a side AC of the target 191.

The distances measured by the sensors provided between the respective units are output to the state detector 171. The state detector 171 obtains an equation of a straight line including the line AB from $\alpha$ and $\beta$ and also obtains the position of the side AB from remaining $\gamma$. Since, displacements OX and OY and a rotating angle $\theta$ of the state detector 171 are obtained, the connecting state (the flex angle and torsional angle) is calculated. In this manner, the state detector 171 calculates the connecting state of the respective connecting portions.

The state detector 171 that calculates the current position and posture has a function of fetching information from the clinometer 165 and the connecting state detectors and a function of supplying an operation instruction to the medium pressure switching units 161 and the area dividing medium valves 163.

The state detector 171 displays for the operator the calculation results of the position and posture of the elongated movable work apparatus on the mode-displaying monitor 172 in the form of three three-dimensional views and a perspective view.

Furthermore, a monitor camera 201 and an illumination 202 are mounted on the distal end of the main body of the movable work apparatus. An image obtained by the monitor camera 201 is output to the state detector 171.

The operation of the movable driving mechanism for the movable work apparatus having the above arrangement in a pipe will be described.

When the unit 142 on which the clockwise tubes are mounted and the unit 142 on which the counterclockwise tubes are mounted are operated simultaneously through the state detector 171, since these tubes are spirally mounted on the units 142, they generate a thrust of the right-handed screw and a thrust of the left-handed screw respectively. These two rotating thrusts cancel each other, so that the movable work apparatus can travel straight without being twisted.

When the distal end of the main body of the movable work apparatus 141 reaches a T-shaped pipe portion or a bent pipe portion, the flex angle of the connecting portion is changed by the air compressor at the distal end of the main body of the movable work apparatus based on the information, e.g., the image from the monitor camera, thereby guiding the distal end of the main body of the movable work apparatus in a desired direction.

Figure 31:
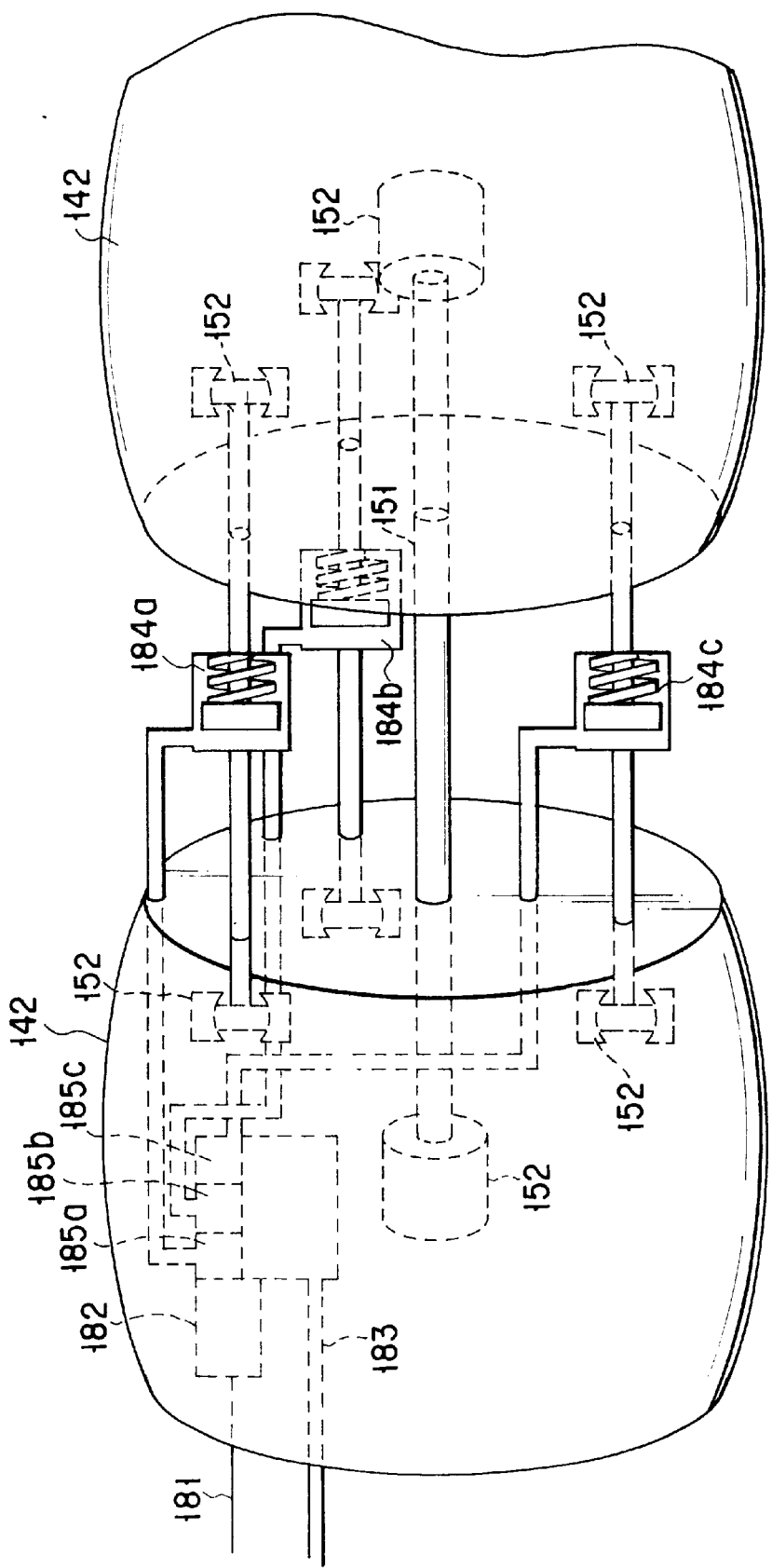
FIG. 31 is a view showing an air compressor mounted on the connecting portion at the distal end portion of the movable work apparatus.

FIG. 31 is a view showing the air compressor mounted on the connecting portion at the distal end of the movable work apparatus.

Referring to FIG. 31, reference numeral 181 denotes a signal line; 182, a controller; and 183, an air supply pipe. Reference symbols 184a to 184c denote air cylinders; and 185a to 185c, solenoid valves, respectively.

The controller 182 controls the opening/closing operations of the solenoid valves 185a to 185c based on a control signal output from the state detector 171 through the signal line 181 to supply air supplied through the air supply pipe 183 to the air cylinders 184a to 184c.

The air cylinders 184a to 184c are mounted around the unit 142 equidistantly and are extended/contracted by air supplied from the state detector 171 through the air supply pipe 183 and the solenoid valves 185a to 185c, thereby changing the flex angle of the distal end of the main body of the movable work apparatus.

Although a case wherein air cylinders are used is described in the above description, they can be replaced with rubbertuators.

The medium pressure switching units 161 are separately provided to the units 142 on which the tubes are wound clockwise and the units 142 on which the tubes are wound counterclockwise. Hence, when the medium pressure switching units 161 are operated in directions to cancel the forward/backward thrusts of the right- and left-handed screws, the movable work apparatus can rotate. Also, the movable work apparatus can travel forward/backward while rotating by controlling the switching method of the medium pressure switching units 161.

The grooves or ridges on the surfaces of the contact members 164 of the units 142 on which the tubes are wound clockwise or counterclockwise serve as a resistance in a direction perpendicular to the tubes but allow slippage in the longitudinal direction of the tubes. Thus, the clockwise and counterclockwise tubes have sufficient frictional force in a direction in which thrusts are generated (in the direction perpendicular to the tubes), and slip in a direction against the thrusts (in the longitudinal direction of the tubes).

Therefore, the thrusts in the right- and left-handed screws of the clockwise and counterclockwise tubes operate independently of each other without interfering with each other.

Since the respective units 142 are coupled such that they can rotate to a predetermined angle, the rotating posture of the distal end of the main body of the movable work apparatus 141 can be altered.

Furthermore, since the driving portion is divided into areas and the medium pressure switching units 161 are arranged near the respective areas, the lengths of the medium pipe systems are decreased, so that the medium pressures can be switched at a high speed.

The state detector 171 fetches information from the clinometer 165 and the connecting state detectors to calculate the current posture of the movable work apparatus 141. More specifically, the posture of the distal end of the main body of the movable work apparatus 141 can be measured from the information from the clinometer 165. As the lengths of the respective units 142 are known, the entire mode of the movable work apparatus 141 is calculated by performing coordinate calculation by using the flex angle and torsional angle of the connecting portions continuously from the distal end to the base of the main body.

When the posture of the main body, ranging from the base to the distal end, is calculated only from information on the flex angle and torsional angle supplied from the connecting state detectors of the respective connecting portions, errors accumulate until the distal end of the main body is reached due to the coordinate calculation. However, in this embodiment, the posture of the movable work apparatus is corrected from the posture data of the distal end of the main body which is detected by the clinometer 165 with reference to the operating point of thie distal end of the main body.

Furthermore, since corner portions of the pipe are known from the calculation result of the mode of the movable work apparatus 141, the medium pressure switching units 161 and the area dividing medium valves 163 are controlled by changing the pressure switching speed or stopping intake/ exhaust of the medium to/from the tubes of a specific area, such that a corner portion is made less sharp by, e.g., advancing the traveling wave before the corner portion and delaying the traveling wave after the corner portion, thereby decreasing the drag acting on the corner portion.

The monitor 172 of the state detector 171 can display for the operator the calculation result of the mode of the elongated movable work apparatus 141, in addition to the image of the monitor camera 181 illuminated by the illumination 182 at the distal end of the movable work apparatus, in the form of three three-dimensional views and a perspective view.

For example, as shown in FIG. 25, the screen of one monitor 172 is divided into four areas, and the mode of the movable work apparatus 141 can be displayed in the form of three views in the X, Y, and Z directions and a perspective view simultaneously.

If geographical information on the pipe shape is provided and the direction of the movable work apparatus 141 can be measured by, e.g., loading a gyroscope on the movable work apparatus 141, the current mode of the medium pressure switching unit 14 can be displayed overlapping on the pipe shape of the operation target.

In the description of the above embodiment, the movable work apparatus 141 is constituted by winding tubes extending in different directions on the respective units. However, the present invention is not limited to this.

More specifically, in the same manner as in the case described regarding the convey apparatus according to the above third embodiment, tubes extending in orthogonal directions may be stacked on the respective units, contact members constituted by, e.g., elastic bodies, may be mounted on the interstices of these tubes, and these tubes may be controlled independently of each other by medium pressure switching units mounted in units of units.

In this case, area dividing medium valves for dividing each tube into a plurality of areas may be provided to the medium pipe systems of the respective units, as has been described with reference to the above third embodiment.

Accordingly, in this embodiment, the movable work apparatus 141 can freely travel or rotate by controlling the switching methods of the medium pressure switching units 161.

The torsional flexing function between the respective units 142 allows the unit connecting portions to rotate up to a predetermined angle. Therefore, when a work apparatus is loaded, it does not require a rotating posture alteration unit.

Since the grooves or ridges of the contact members 164 extending in the longitudinal direction of the tubes allow thrusts of the right- and left-handed screws of the clockwise and counterclockwise tubes to act independently of each other without interfering with each other, the movable work apparatus can move without using power more than necessary for traveling.

Since the medium pressure switching units 161 provided near the respective areas switch the medium pressures at high speed, the moving speed of the movable work apparatus 141 can be increased.

Since the state detector 171 can calculate the current mode of the movable work apparatus 141, the direction in which the movable work apparatus 141 travels the next and the direction in which the movable work apparatus 141 performs the operation can be determined.

Any corner portion of the pipe is determined from the current mode of the movable work apparatus 141, and the traveling waves before and after the corner portion are controlled by using the area dividing medium valves 163 and the state detector 171, so that the corner portion can be rendered less sharp. Then, the drag acting on the corner portion can be decreased, so that the movable work apparatus can smoothly pass even the corner portion without being caught by it.

The calculation results of the position and posture of the movable work apparatus 141 are displayed for the operator on the monitor 172 in the form of three three-dimensional views and a perspective view. Thus, the operator can determine at a glance to where the operation has progressed, and can also determine, e.g., at which position and in which direction the image of the object is obtained by the monitor camera. Therefore, an operation such as checking of a portion where a pipe trouble has occurred can be performed smoothly.

As has been described above in detail, according to the present invention, there is provided a convey apparatus capable of conveying a convey target without locally applying an excessive force to it.

There is also provided a movable driving mechanism for a movable work apparatus with a simple arrangement, which can freely move in a pipe and can ensure a sufficiently large space for loading the work apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A convey apparatus comprising:

a convey portion having a convey surface for conveying a convey target and medium passages for passing a medium therethrough, said medium passages having a cross sectional area capable of being freely increased and decreased; and carrier wave generating means for controlling pressure of the medium supplied respective of said medium passages of said convey portion to increase or decrease the cross sectional area of said medium passages so as to generate a peristaltic motion in which contact portions, to be contacted with the convey target, of the convey surface move not only in a gravitation direction but also in a direction of conveyance, on said convey surface of said convey portion for conveying the convey target, wherein the medium passages comprise:
lower medium passages arranged parallel to each other at a predetermined gap; and
upper medium passages stacked on the lower medium passages to contact respective adjacent ones of the lower medium passages such that bottom positions of the upper medium passages are influenced by the lower medium passages.

2. The apparatus according to claim 1, further comprising a member for suppressing changes in cross sectional area of said medium passages within a predetermined range.

3. The apparatus according to claim 1, further comprising a member for suppressing changes in a length of said medium passages in a longitudinal direction within a predetermined range.

4. The apparatus according to claim 1, further comprising medium pressure holding means for maintaining a pressure of the medium supplied to said medium passages to not less than a predetermined value.

5. The apparatus according to claim 1, wherein said lower medium passages and upper medium passages are tubes.

6. The apparatus according to claim 1, wherein said carrier wave generating means comprises:
a housing formed with medium holes for supplying the medium to said medium passages of said convey portion;
a shaft rotatably supported in said housing and formed with intake/exhaust holes for performing intake or exhaust of the medium in said medium passages through the medium holes formed in said housing; and
driving means for rotating said shaft.

7. The apparatus according to claim 6, further comprising relay means for relaying at least one set of said intake/exhaust holes formed in said shaft.

8. The convey apparatus according to claim 1, wherein said convey portion is divided into a plurality of areas, and further comprises medium valves for stopping a medium supplied to said medium passages of said divided areas.

9. A convey apparatus comprising:
a convey portion having a convey surface for conveying a convey target and medium passages for passing a medium therethrough, said medium passages having a cross sectional area capable of being freely increased and decreased; and
carrier wave generating means for controlling pressure of the medium applied to said respective medium passage of said convey portion to increase or decrease the cross sectional area of said medium passages so as to generate a carrier wave on said convey surface of said convey portion for conveying the convey target,
medium pressure detection means for detecting a pressure of a medium supplied to at least one of said medium passages; and
informing means for informing a leak of the medium when said medium pressure detection means detects that a pressure of the medium supplied to at least one medium passage is not more than a predetermined value.

10. A convey apparatus comprising:
a convey portion having a convey surface for conveying a convey target and medium passages for passing a medium therethrough, said medium passages having a cross sectional area capable of being freely increased and decreased; and
carrier wave generating means for controlling pressure of the medium applied to said respective medium passage of said convey portion to increase or decrease the cross sectional area of said medium passages so as to generate a carrier wave on said convey surface of said convey portion for conveying the convey target;
wherein said convey portion comprises:
first tubes arranged parallel to each other at a predetermined gap,
second tubes extending perpendicular to said first tube and parallel to each other at a predetermined gap, said second tube being alternately braided in contact with one circumferential surface portion, or with the other circumferential surface portion opposite to one circumferential surface portion, of each of said first tubes, and
contact members arranged on interstices of said first and second tubes and mounted on said first and second tubes; and
said carrier wave generating means comprises:
first medium pressure control means for performing pressure control of a medium supplied to said first tubes, and
second medium pressure control means for performing pressure control of a medium supplied to said second tubes.

11. A convey apparatus comprising:
a convey portion having a convey surface for conveying a convey target and medium passages for passing a medium therethrough, said medium passages having a cross sectional area capable of being freely increased and decreased; and
carrier wave generating means for controlling pressure of the medium supplied to said respective medium passages of said convey portion to increase or decrease the cross sectional area of said medium passages so as to generate a carrier wave on said convey surface of said convey portion for conveying the convey target,
wherein said convey portion comprises:
lower tubes arranged parallel to each other at a predetermined gap; and
rods stacked on said lower tubes to respectively contact adjacent ones of said lower tubes.

* * * * *

UNITED STATES PATENT AND TRADEMARK OFFICE
CERTIFICATE OF CORRECTION

PATENT NO. : 5,950,805

DATED : September 14, 1999

INVENTOR(S): Yoshinobu ISHIKAWA, et al.

It is certified that an error appears in the above-identified patent and that said Letters Patent is hereby corrected as shown below:

On the title page, item [30] should be:

--[30] Foreign Application Priority Data
    Oct. 31, 1995 [JP] Japan ............ 7-283291
    Feb. 22, 1996 [JP] Japan ............ 8-034701--

Signed and Sealed this

Second Day of January, 2001

Attest:

Q. TODD DICKINSON

*Attesting Officer*      *Commissioner of Patents and Trademarks*